United States Patent
Ishii et al.

(10) Patent No.: US 10,126,732 B2
(45) Date of Patent: Nov. 13, 2018

(54) DEVICE FOR CONTROLLING MACHINE TOOL

(71) Applicant: MAKINO MILLING MACHINE CO., LTD., Tokyo (JP)

(72) Inventors: Kazunari Ishii, Aiko-gun (JP); Takehito Shinada, Aiko-gun (JP); Masashi Nagaya, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 238 days.

(21) Appl. No.: 15/039,773

(22) PCT Filed: Nov. 29, 2013

(86) PCT No.: PCT/JP2013/082269
§ 371 (c)(1),
(2) Date: May 26, 2016

(87) PCT Pub. No.: WO2015/079583
PCT Pub. Date: Jun. 4, 2015

(65) Prior Publication Data
US 2017/0003671 A1 Jan. 5, 2017

(51) Int. Cl.
*G05B 19/402* (2006.01)
*G05B 19/18* (2006.01)
(Continued)

(52) U.S. Cl.
CPC ........... *G05B 19/402* (2013.01); *G05B 19/18* (2013.01); *G05B 19/35* (2013.01);
(Continued)

(58) Field of Classification Search
CPC .............................. G05B 19/18; G05B 19/182
See application file for complete search history.

(56) References Cited

U.S. PATENT DOCUMENTS

| 4,664,570 | A | 5/1987 | Tsukiji et al. |
| 2010/0292822 | A1* | 11/2010 | Hahn ............... G05B 19/40937 700/98 |
| 2016/0179085 | A1* | 6/2016 | Seitz .................... G05B 19/414 700/180 |

FOREIGN PATENT DOCUMENTS

| EP | 1 302 829 | 4/2003 |
| JP | 61-79508 | 4/1986 |

(Continued)

OTHER PUBLICATIONS

International Search Report dated Jan. 21, 2014, directed to International Application No. PCT/JP2013/082269, 1 page.
(Continued)

*Primary Examiner* — Nicholas J Tobergte
(74) *Attorney, Agent, or Firm* — Morrison & Foerster LLP

(57) ABSTRACT

This machine tool has a first rotating feed shaft around a first inclined axis line. Table coordinates are set ahead of time in the machine tool. The table coordinates have imaginary first, second and third linear motion axes that are perpendicular to each other, and an imaginary first rotating feed axis around an imaginary first axis line. The imaginary third linear motion axis is parallel to a third linear motion shaft. One imaginary linear motion axis of the imaginary first linear motion axis or the imaginary second linear motion axis is set above the surface of a workpiece attachment surface, and the imaginary first axis line is set parallel to the one imaginary linear motion axis. A computation unit computes the coordinate values of the imaginary first rotating feed axis in the table coordinates, and a display unit displays the coordinate values of the imaginary first rotating feed axis.

10 Claims, 22 Drawing Sheets

(51) Int. Cl.
  *G05B 19/35* (2006.01)
  *G05B 19/408* (2006.01)
(52) U.S. Cl.
  CPC .............. *G05B 19/4086* (2013.01); *G05B 2219/50174* (2013.01); *G05B 2219/50353* (2013.01)

(56) References Cited

FOREIGN PATENT DOCUMENTS

| JP | 5-282047 | 10/1993 |
| JP | 8-229770 | 9/1996 |
| JP | 2010-269417 | 12/2010 |

OTHER PUBLICATIONS

Kaneko, J. et al. (Jan. 2012). "Planning Method for Fixture Conditions of Workpiece in Continuous Multi-Axis Controlled Machining Process With Consideration of Energy Consumption About Translational Axes of Machine Tool," Procedia CIRP vol. 1:126-131.
Extended Search Report dated Jul. 6, 2017, directed to EP Application No. 13898270.7; 10 pages.
(Sep. 2013)."CNC 8065 Programming Manual," located at URL:http://www.fagorautomation.com/downloads/manuales/de/man_8065_prg.pdf, retrieved on Jun. 29, 2017. (1,476 pages).

* cited by examiner

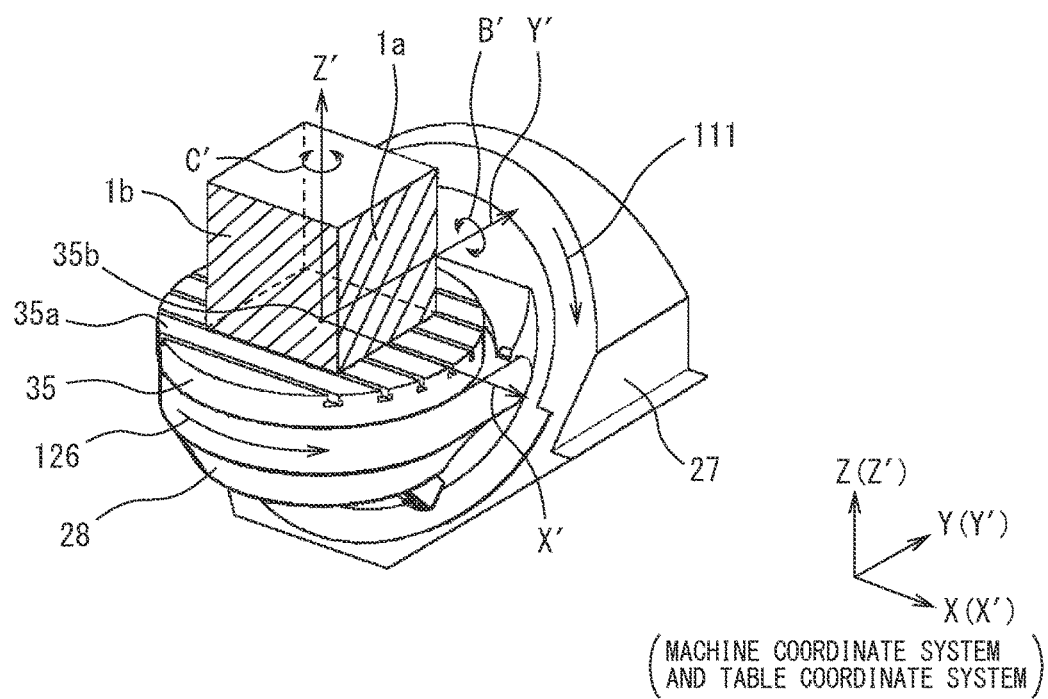

|   | TABLE COORDINATES |   | MACHINE COORDINATES |
|---|---|---|---|
| X' | 0.0000 | X | 0.0000 |
| Y' | 0.0000 | Y | 0.0000 |
| Z' | 0.0000 | Z | 0.0000 |
| C' | 0.0000 | C | 291.1684 |
| B' | −90.0000 | B | −150.4122 |

|  | TABLE COORDINATES |  | MACHINE COORDINATES |
|---|---|---|---|
| X' | 0.0000 | X | 0.0000 |
| Y' | 0.0000 | Y | 0.0000 |
| Z' | 0.0000 | Z | 0.0000 |
| C' | 0.0000 | C | 0.0000 |
| A' | 0.0000 | B | 0.0000 |

DEVICE FOR CONTROLLING MACHINE TOOL

CROSS-REFERENCE TO RELATED APPLICATIONS

This application is a U.S. National Stage patent application of International Patent Application No. PCT/JP2013/082269, filed Nov. 29, 2013, which is hereby incorporated by reference in the present disclosure in its entirety.

FIELD OF THE INVENTION

The present invention relates to a control device of a machine tool.

BACKGROUND OF THE INVENTION

In conventional technology, machine tools are known that cause relative movement of a tool with respect to a workpiece to perform machining such as cutting. Among such machine tools, numerically-controlled machine tools are known that specify the tool path with a coordinate or the like of a predetermined axis and perform machining while moving the tool automatically with respect to a workpiece. By moving at least one of the workpiece and the tool, the relative position of the tool with respect to the workpiece can be changed. As a method of changing the relative position of the tool with respect to the workpiece, control is known in which the workpiece or the tool is rotated along a rotary feed axis about an axis line, besides control of moving the workpiece or the tool along a linear motion axis.

The axis line of the rotary feed axis for relative movement of the tool with respect to the workpiece can be set parallel to the linear motion axis, for example. In other words, rotary movement of the workpiece or the tool can be caused about the axis line parallel to the linear motion axis. Examples of the machine tool in which the axis line of the rotary feed axis is set parallel to the linear motion axis include a machine tool which rotates a table in the B-axis direction about an axis line parallel to the Y-axis and a machine tool which rotates a table in the A-axis direction about an axis line parallel to the X-axis.

In such machine tools in which the axis line of the rotary feed axis is set parallel to the linear motion axis, a table can be supported by arranging a supporting member at one end or both ends in the axis line of the rotary feed axis. However, when one end in the axis line of the rotary feed axis is supported, there is a problem that the support stiffness for the table decreases. When ends on both sides in the axis line of the rotary feed axis are supported, two supporting members are called for, and there is a problem of a device supporting the table being large in size. Thus, a machine tool is proposed in which an axis line of a rotary feed axis is inclined with respect to a linear motion axis.

In Japanese Laid-open Patent Publication No. 61-79508A, a numerically-controlled machine tool is disclosed including a table which rotates about a central axis of rotation inclined by 45 degrees with respect to the horizontal direction, wherein a table itself rotates about another central axis of rotation which intersects with the central axis of rotation at a 45-degree inclination. The publication discloses that, upon performing oblique machining on a workpiece, the angular position of rotation of an inclined rotation table and the position of a tool are obtained by a predetermined formula, and the machine tool is positioned in the position to perform machining.

CITATIONS LIST

Patent literature 1: Japanese Laid-open Patent Publication No. 61-79508A

SUMMARY OF THE INVENTION

Through an arrangement such that the axis line of a rotary feed axis is inclined with respect to a linear motion axis, the support stiffness for a table can be increased relative to a machine tool in which the axis line of the rotary feed axis is set parallel to the linear motion axis and one end in the axis line of the rotary feed axis is supported. In addition, a device supporting the table can be reduced in size relative to a machine tool with support at both ends in the axis line of the rotary feed axis.

When machining a workpiece, a numerically-controlled machine tool can perform machining automatically on the basis of a machining program, the machining program being generated with a CAM device or the like. On the other hand, there are cases where the relative position of a tool with respect to a workpiece is set manually, even with a numerically-controlled machine tool. For example, there are cases where an operator adjusts the relative position of a tool with respect to a workpiece through operation of a feed button for a linear motion axis or rotary feed axis or a manual pulse generator while looking at the workpiece and the tool.

When determining the relative position of a tool with respect to a workpiece manually, the motion of the workpiece is complicated with a machine tool in which the axis line of the rotary feed axis is inclined with respect to the linear motion axis, compared to a machine tool in which the axis line of the rotary feed axis is parallel to the linear motion axis. In other words, because the axis line of the rotary feed axis is inclined, the workpiece rotates also in an inclined state. For an operator who has conventionally used a machine tool in which the axis line of the rotary feed axis is parallel to the linear motion axis, the direction of inclination of the workpiece may not be estimable upon rotating a table. Further, the operator of the machine tool may not be able to accurately grasp the relative position of the workpiece with respect to the tool. Particularly, the orientation of the workpiece with respect to the tool may not be accurately graspable. Therefore, the orientation of the workpiece with respect to the tool may not be easily settable.

For example, when manually determining the relative position of a tool with respect to a workpiece, an operator can grasp the orientation of the workpiece with respect to the tool through the coordinate value of each axis displayed in an operation panel. However, because the axis line of the rotary feed axis is inclined, the coordinate value of the rotary feed axis of a machine coordinate system is a complicated value, and determining whether or not the workpiece is in a desired orientation may be difficult.

A control device of a machine tool of the present invention is a control device of a machine tool including a first linear motion axis, a second linear motion axis, and a third linear motion axis of a machine coordinate system which are orthogonal to each other and a first rotary feed axis about a first axis line inclined with respect to all linear motion axes of the first linear motion axis, the second linear motion axis, and the third linear motion axis, wherein an arithmetic unit which calculates, from a coordinate value of the machine coordinate system, a coordinate value of a table coordinate system including a first virtual linear motion axis, a second virtual linear motion axis, and a third virtual linear motion axis orthogonal to each other with a reference being a workpiece attachment surface of a table and a first virtual rotary feed axis about a first virtual axis line parallel to any virtual linear motion axis of the first virtual linear motion axis, the second virtual linear motion axis, and the third virtual linear motion axis and a display unit which displays a coordinate value of the table coordinate system calculated by the arithmetic unit are provided.

The present invention described above may be such that the third virtual linear motion axis of the table coordinate system is parallel to the third linear motion axis extending in a direction of an axis line of a spindle of the machine tool and is maintained constant in orientation when the workpiece attachment surface has moved, one virtual linear motion axis of the first virtual linear motion axis and the second virtual linear motion axis is set on a surface of the workpiece attachment surface and moves within a plane perpendicular to the third virtual linear motion axis together with movement of the workpiece attachment surface, the first virtual axis line is set parallel to the one virtual linear motion axis, the arithmetic unit computes a coordinate value of the first virtual rotary feed axis of the table coordinate system corresponding to a coordinate value of the first rotary feed axis of the machine coordinate system, and the display unit displays a coordinate value of the first virtual rotary feed axis of the table coordinate system.

The present invention described above may be such that a coordinate value of the first virtual rotary feed axis corresponds to an angle of the workpiece attachment surface with respect to a plane perpendicular to the third virtual linear motion axis.

The present invention described above may be such that the machine coordinate system includes a second rotary feed axis about a second axis line, the second axis line extends in a direction perpendicular to the workpiece attachment surface of the table, the table coordinate system includes a second virtual rotary feed axis about a second virtual axis line, the second virtual axis line extends in a direction perpendicular to the workpiece attachment surface of the table, a coordinate value of the second virtual rotary feed axis is an angle which changes in correspondence with a rotation angle about the first axis line upon rotation of the table about the first axis line, the arithmetic unit computes a coordinate value of the second virtual rotary feed axis of the table coordinate system corresponding to a coordinate value of the first rotary feed axis of the machine coordinate system, and the display unit displays a coordinate value of the second virtual rotary feed axis of the table coordinate system.

The present invention described above may be such that, a reference line extending in a direction identical to the one virtual linear motion axis is fixed to the workpiece attachment surface upon a coordinate value of the second virtual rotary feed axis being 0°, and the reference line is moved together with the workpiece attachment surface, a coordinate value of the second virtual rotary feed axis corresponds to an angle between the one virtual linear motion axis and the reference line, upon the table having rotated about the first axis line.

The present invention described above may be such that, when rotary movement of the table takes place about the first axis line, the arithmetic unit sets a rotation angle about the second axis line in correspondence with a rotation angle about the first axis line so that a portion specified in advance of a workpiece attached to the workpiece attachment surface is maintained in an orientation specified in advance, and control of causing rotary movement of the table about the second axis line along with rotary movement of the table about the first axis line is performed.

The present invention described above may be such that an input unit which allows input of movement information for implementing rotary movement about the first axis line manually is provided, and rotary movement of the table about the first axis line is implemented on a basis of movement information input to the input unit.

The present invention described above may be such that the input unit allows input of a control code relating to rotary movement about the first axis line, and rotary movement about the first axis line is implemented on a basis of the control code.

The present invention described above may be such that the display unit is formed to allow selecting display of a table coordinate for which the first virtual linear motion axis is set on a surface of the workpiece attachment surface or display of a table coordinate for which the second virtual linear motion axis is set on a surface of the workpiece attachment surface.

The present invention described above may be such that the display unit displays a schematic view of a machine tool including a rotary feed axis about an axis line which is parallel to one linear motion axis of the first linear motion axis and the second linear motion axis, and, in the schematic view, a rotation angle of the first virtual rotary feed axis is set to a rotation angle about the axis line which is parallel.

The present invention can provide a control device of a machine tool with which the orientation of a workpiece with respect to a tool can be determined easily, when changing the relative position of the workpiece with respect to the tool manually.

BRIEF DESCRIPTION OF THE DRAWINGS

FIG. 17 is the coordinate display unit in the third step of the first control of Embodiment 1.

FIG. 18 is a schematic perspective view of the table and the workpiece in a first step of a second control of Embodiment 1.

DETAILED DESCRIPTION OF THE DRAWINGS

Referring to FIG. 1 to FIG. 25, a control device of a machine tool in Embodiment 1 will be described. In the present embodiment, a vertical and numerically-controlled machine tool will be described as an example.

Figure 1:
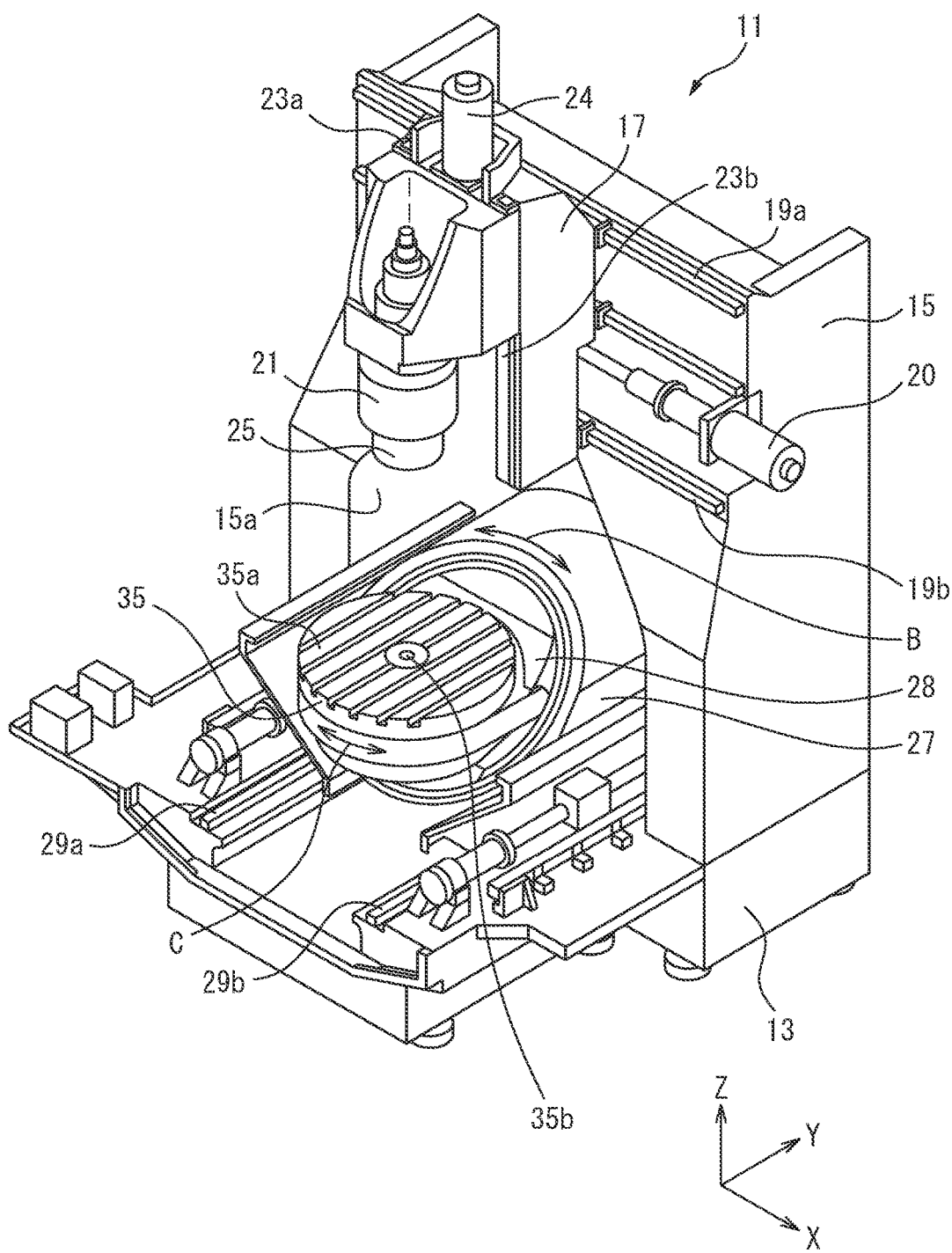
FIG. 1 is a schematic perspective view of a machine tool in an embodiment.
Figure 2:
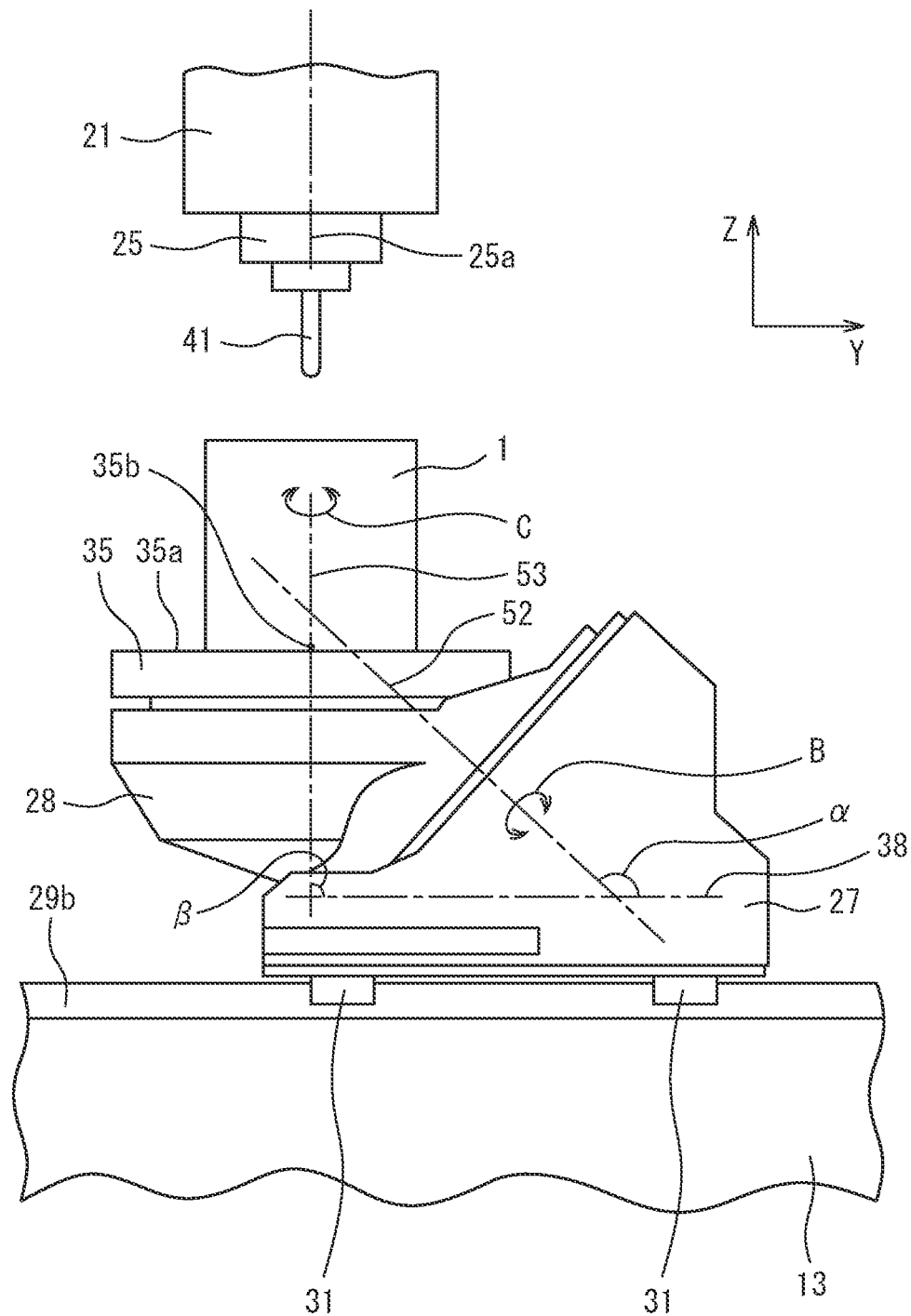
FIG. 2 is a schematic side view of portions of a bed, a moving body, and a spindle head of the machine tool in the embodiment.

FIG. 1 is a schematic perspective view of the machine tool in the present embodiment. FIG. 2 is a schematic side view of a bed, a moving body, and a spindle head of the machine tool. Referring to FIG. 1 and FIG. 2, a machine tool 11 includes a bed 13 as a base and a column 15 standing on the upper surface of the bed 13. On the upper surface of the bed 13, a moving body 27 is arranged. The moving body 27 supports a table 35 via an inclination swivel base 28. To a workpiece attachment surface 35a of the table 35, a workpiece 1 is to be fixed. The workpiece attachment surface 35a is formed in a planar shape.

On the front surface of the column 15, a saddle 17 is arranged. Further, on the front surface of the saddle 17, a spindle head 21 is arranged. To the spindle head 21, a spindle 25 is attached. To the spindle 25, a tool 41 with which the workpiece 1 is machined is attached. The tool 41 machines the workpiece 1 while rotating together with the spindle 25.

The machine tool 11 in the present embodiment includes a moving device which changes the relative position of the tool 41 with respect to the workpiece 1. A machine coordinate system with the origin in a predetermined position in the machine tool 11 is set in advance. The machine coordinate system includes the X-axis, the Y-axis, and the Z-axis as linear motion axes orthogonal to each other. In addition, the machine coordinate system includes the B-axis and the C-axis as rotary feed axes.

In the machine tool, a state in which coordinate values of all linear motion axes are zero and further the coordinate values of all rotary feed axes are 0° is referred to as reference state. In the reference state, the direction in which an axis line 25a of the spindle 25 extends is set as the Z-axis. The machine tool 11 of the present embodiment is vertical, and the Z-axis extends in the vertical direction. The X-axis and the Y-axis are set on a plane perpendicular to the Z-axis. In the machine tool 11 of the present embodiment, a horizontally extending axis in which the moving body 27 moves is set as the Y-axis. An axis extending in the horizontal direction in which the saddle 17 moves, i.e., direction perpendicular to the Z-axis and the Y-axis, is set as the X-axis.

The center line of rotation of the inclination swivel base 28 is an axis line 52, and the rotary feed axis about the axis line 52 is set as the B-axis. The center line of rotation of the table 35 is an axis line 53, and the rotary feed axis about the axis line 53 is set as the C-axis. The workpiece attachment surface 35a of the table 35 is formed in a planar and circular shape. The C-axis passes through a center 35b of the workpiece attachment surface 35a and extends in the direction perpendicular to the workpiece attachment surface 35a.

The moving device can relatively move the tool 41 and the workpiece 1 in the X-axis direction, the Y-axis direction, and the Z-axis direction. Further, the moving device can cause rotary movement of the workpiece 1 relative to the tool 41 in the B-axis direction about the axis line 52 and the C-axis direction about the axis line 53.

The moving device includes an X-axis movement device which causes relative movement of the tool 41 with respect to the workpiece 1 in the X-axis direction. The X-axis movement device includes a pair of X-axis rails 19a and 19b formed on the front surface of the column 15. The saddle 17 is formed to be capable of reciprocal movement along the X-axis rails 19a and 19b. The X-axis movement device includes an X-axis servomotor 20 which moves the saddle 17 with a ball screw mechanism or the like. The spindle head 21 and the tool 41 move together with the saddle 17 in the X-axis direction.

The moving device includes a Y-axis movement device which causes relative movement of the tool 41 with respect to the workpiece 1 in the Y-axis direction. The Y-axis movement device includes a pair of Y-axis rails 29a and 29b arranged on the upper surface of the bed 13. The moving body 27 is supported to the Y-axis rails 29a and 29b via a guide block 31. The moving body 27 is formed to be capable of reciprocal movement along the Y-axis rails 29a and 29b. In the column 15, a hollow part 15a is formed so that the moving body 27 is movable in the Y-axis direction. The Y-axis movement device includes a Y-axis servomotor which moves the moving body 27 with a ball screw mechanism or the like. The inclination swivel base 28 and the table 35 move together with the moving body 27 in the Y-axis direction.

The moving device includes a Z-axis movement device which causes relative movement of the tool 41 with respect to the workpiece 1 in the Z-axis direction. The Z-axis movement device includes a pair of Z-axis rails 23a and 23b formed on the front surface of the saddle 17. The spindle head 21 is formed to be capable of reciprocal movement along the Z-axis rails 23a and 23b. The Z-axis movement device includes a Z-axis servomotor 24 for moving the spindle head 21 with a ball screw mechanism or the like. The tool 41 moves together with the spindle head 21 in the Z-axis direction. Further, inside the spindle head 21, a drive motor which rotates the spindle 25 about the axis line 25a is arranged.

The moving device includes a B-axis rotary movement device which rotates the tool 41 relative to the workpiece 1 in the B-axis direction. The axis line 52 of the B-axis in the present embodiment is the center line of inclined rotation which is inclined with respect to all axes of the X-axis, the Y-axis, and the Z-axis. The B-axis rotary movement device includes the inclination swivel base 28. Inside the moving body 27, a B-axis servomotor for rotating the inclination swivel base 28 is arranged. Driving the B-axis servomotor rotates the inclination swivel base 28 about the axis line 52 of the B-axis. The workpiece 1 rotates together with the inclination swivel base 28 and the table 35 in the B-axis direction.

The moving device includes a C-axis rotary movement device which rotates the tool 41 relative to the workpiece 1 in the C-axis direction. The axis line 53 of the C-axis is formed to be parallel to the Z-axis when the machine tool is in the reference state. The C-axis rotary movement device includes the table 35. Inside the inclination swivel base 28, a C-axis servomotor is arranged. Driving the C-axis servomotor rotates the table 35 about the axis line 53 of the C-axis. The workpiece 1 rotates together with the table 35 in the C-axis direction.

In this manner, the machine tool 11 includes three linear motion axes in which the tool 41 moves relative to the workpiece 1. The present embodiment is described with a first linear motion axis as the X-axis, a second linear motion axis as the Y-axis, and a third linear motion axis as the Z-axis. The machine tool 11 includes two rotary feed axes for rotary movement of the spindle 25 relative to the workpiece 1. The machine tool 11 includes the axis line 52 of the B-axis and the axis line 53 of the C-axis. The axis line 52 of the B-axis corresponds to a first axis line, and the B-axis corresponds to a first rotary feed axis about the first axis line. The axis line 53 of the C-axis corresponds to a second axis line, and the C-axis corresponds to a second rotary feed axis about the second axis line.

The machine tool in the present embodiment includes the control device. The control device is connected to the servomotor of the moving device. The control device can move the tool 41 relative to the workpiece 1 by controlling the servomotor of the moving device.

The machine tool 11 of the present embodiment is a vertical machine tool, and the XY-plane is parallel to the horizontal direction. The Z-axis is parallel to the vertical direction. The machine tool 11 is such that the workpiece attachment surface 35a of the table 35 is parallel with respect to a plane 38 parallel to the XY-plane of the machine coordinate system, when the angles of rotation for the respective rotary feed axes are 0°.

In the machine tool 11 of the present embodiment, the axis line 52 of the B-axis and the axis line 53 of the C-axis intersect. In other words, the axis line 53 of the C-axis is arranged on the axis line 52 of the B-axis. When the table 35 rotates in the B-axis direction, the axis line 53 of the C-axis also rotates together with the rotation in the B-axis direction. In the present embodiment, an inclination angle α a between the axis line 52 of the B-axis and the XY-plane is set to 137°. The inclination angle α a may be set to 135° or be set to other angles, in accordance with the machine specification. In the machine tool of the present embodiment, the inclination angle α a by which the axis line 52 of the B-axis is inclined is set so that, when the inclination swivel base 28 is rotated 180° in the B-axis direction from a state in which the workpiece attachment surface 35a is parallel to the plane 38, the workpiece attachment surface 35a is inclined with respect to the Z-axis of the machine coordinate system. In the reference state, an angle β of the axis line 53 of the C-axis with respect to the XY-plane is set to 90°.

Figure 3:
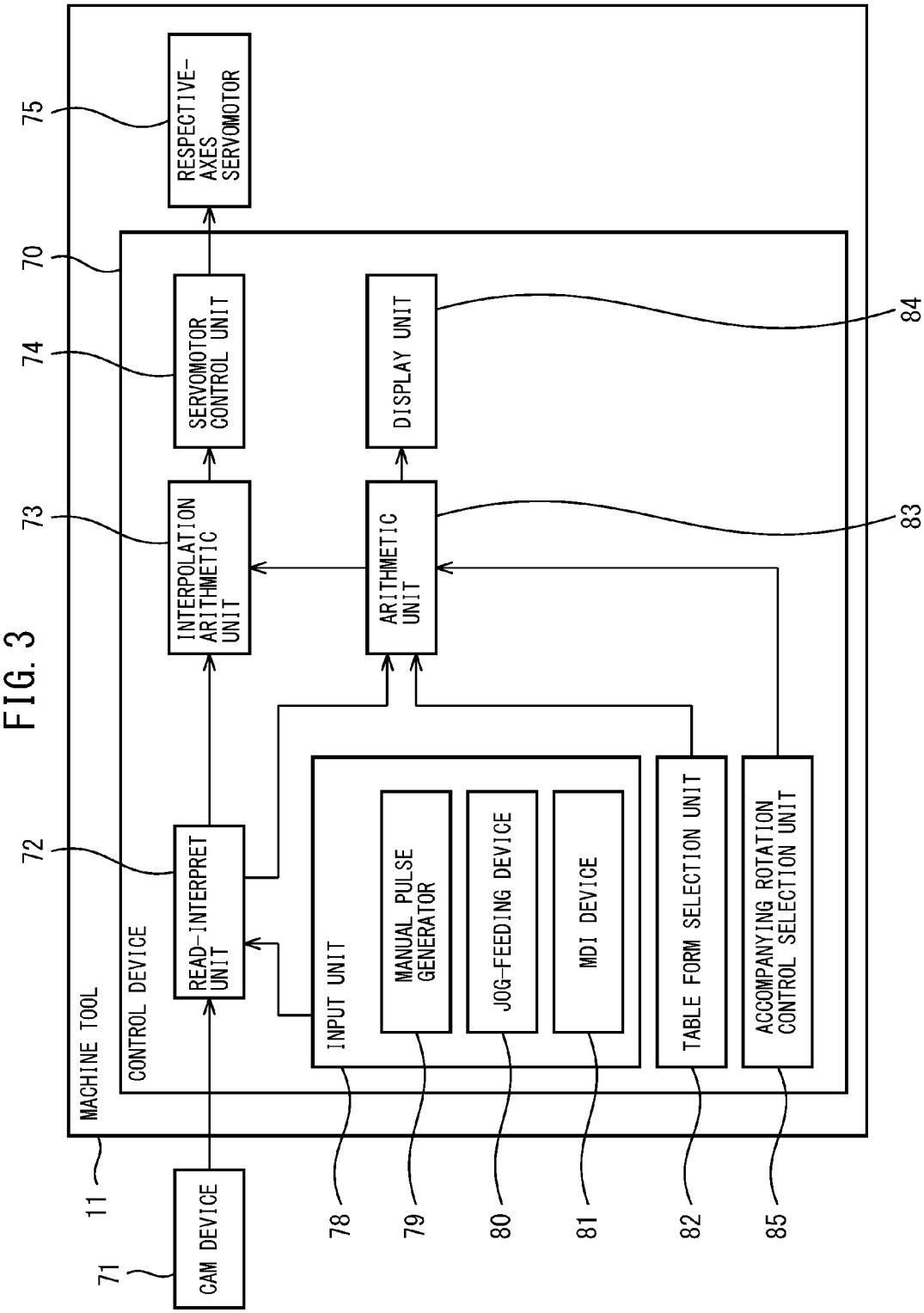
FIG. 3 is a block diagram of a machine tool in the embodiment.

FIG. 3 shows a block diagram of the machine tool in the present embodiment. A machining program for driving the machine tool 11 can be generated in a Computer Aided Manufacturing (CAM) device 71 on the basis of the intended shape of a workpiece. The intended shape of a workpiece can be created in a Computer Aided Design (CAD) device, for example.

A control device 70 of the machine tool 11 includes a read-interpret unit 72, an interpolation arithmetic unit 73, and a servomotor control unit 74. The read-interpret unit 72 reads a machining program output from the CAM device 71 and transmits a programmed movement instruction to the interpolation arithmetic unit 73. The interpolation arithmetic unit 73 computes a position instruction for each interpolation cycle and transmits the position instruction to the servomotor control unit 74. For example, the interpolation arithmetic unit 73 calculates the amount of movement for each time interval set in advance on the basis of the movement instruction. The servomotor control unit 74 drives the respective-axes servomotor 75 on the basis of a position instruction value. The respective-axes servomotor 75 includes the X-axis servomotor 20, the Y-axis servomotor, and the Z-axis servomotor 24 for causing relative movement along the linear motion axes. In the respective-axes servomotor 75, the B-axis servomotor and the C-axis servomotor for causing relative movement about the axis lines of the rotary feed axes are included.

In a machining system including the CAM device 71, the CAM device 71 can generate a machining program of the machine tool 11 automatically. Therefore, a workpiece can be machined automatically without an operator manually operating the machine tool 11.

On the other hand, there are cases where an operator manually causes relative movement of the tool 41 with respect to the workpiece 1 to perform machining. The control device 70 of the present embodiment is formed so that relative movement of the tool 41 with respect to the workpiece 1 can be implemented manually.

The control device 70 includes an input unit 78 to input movement information for changing the relative position of the tool 41 with respect to the workpiece 1 manually. An operator inputs movement information of the linear motion axis and the rotary feed axis to the input unit 78. The input unit 78 includes a manual pulse generator 79. The manual pulse generator 79 includes, for example, a button to select the axis of movement and a disk-shaped operating unit to set the amount of movement. Rotating the operating unit after selecting the axis of movement can cause relative movement in the amount of movement in accordance with the rotation angle of the operating unit.

The input unit 78 includes a jog-feeding device 80. The jog-feeding device 80 includes, for example, a button to select the axis of movement, a button to select movement to the positive side or movement to the negative side, and a button to indicate movement. By pressing the button to indicate movement after selecting the axis of movement and direction of movement, relative movement can be implemented. The amount of movement at this time corresponds to the length of time for which the button is pressed.

When an operator is to cause relative movement of the tool 41 with respect to the workpiece 1 manually, approximate positioning can be performed by using the jog-feeding device 80, for example. Further, by using the manual pulse generator 79, precise positioning can be performed.

Further, the input unit 78 includes a Manual Data Input (MDI) device 81. The MDI device 81 is a device to manually input control data such as movement information to control the moving device. An operator inputs movement information of respective axes or a control code in M code or the like to the MDI device 81. The control device 70 implements relative movement of the tool 41 with respect to the workpiece 1 in accordance with the input control data.

The input unit of the control device is not limited to the form described above, and any device may be employed which allows an operator to input movement information of the respective axes upon changing the relative position of a tool with respect to a workpiece manually.

The movement information input to the input unit 78 is transmitted to the read-interpret unit 72. The movement information read by the read-interpret unit 72 is transmitted to an arithmetic unit 83. The arithmetic unit 83 transmits a movement instruction based on the movement information to the interpolation arithmetic unit 73. Next, a position instruction is transmitted to the servomotor control unit 74 from the interpolation arithmetic unit 73 to implement relative movement. The control device 70 includes a display unit 84. The display unit 84 displays information of the relative position of the tool with respect to the workpiece which has been computed by the arithmetic unit 83.

Figure 4:
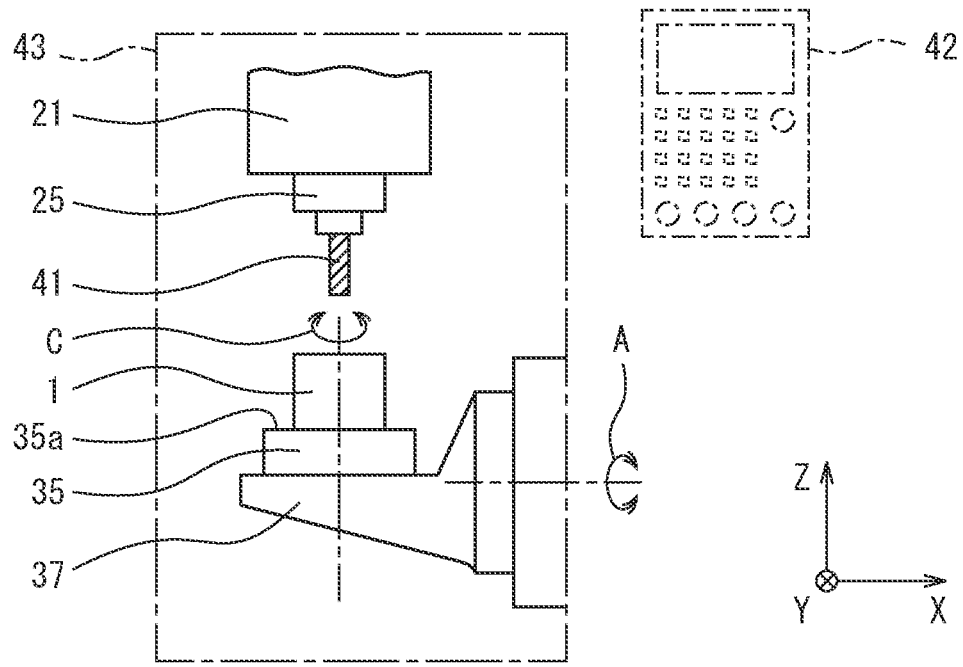
FIG. 4 is a schematic view of a machine tool of type A of a reference example.
Figure 5:
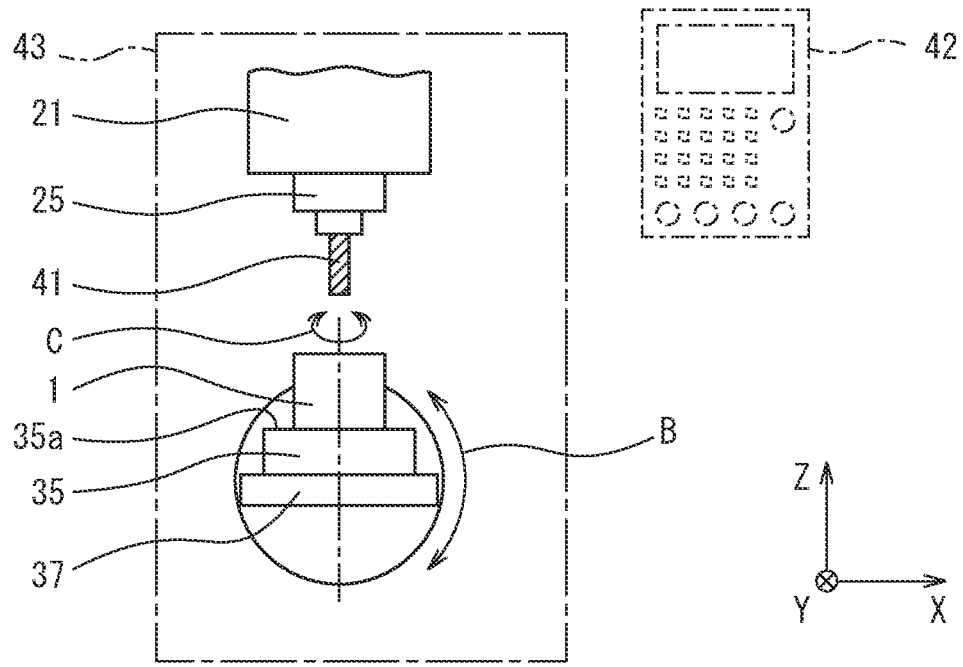
FIG. 5 is a schematic view of a machine tool of type B of a reference example.

Referring to FIG. 4 and FIG. 5, a machine tool of a reference example will be described. The machine tool of the reference example is formed so that axis lines of all rotary feed axes are parallel to a linear motion axis, in the reference state. FIG. 4 is a schematic view of the machine tool in which the A-axis is set as the rotary feed axis. FIG. 5 is a schematic view of the machine tool in which the B-axis is set as the rotary feed axis.

FIG. 4 shows a situation when the table 35 is seen through a window part 43 by an operator from a position which allows operation of an operation panel 42. In a predetermined position of the machine tool, the operation panel 42 for operating the machine tool is arranged. Near the operation panel 42, the window part 43 is formed. Through the window part 43, an operator can check the position or machining situation of the tool 41 and the workpiece 1 while operating the operation panel 42.

In the vertical machine tool, the X-axis is set so that the right side is the positive side when the table 35 is seen by an operator. The A-axis as the rotary feed axis about the axis line parallel to the X-axis is set. The table 35 is provided on a swivel base 37 which rotates in the A-axis direction. The C-axis as the rotary feed axis about the axis line extending perpendicularly to the workpiece attachment surface 35a of the table 35 is set. When the table 35 rotates in the A-axis direction, the axis line of the C-axis also rotates about the axis line of the A-axis. Such a machine tool in which the axis line of the C-axis is arranged on the axis line of the A-axis is referred to as a machine tool of type A in the present invention.

FIG. 5 shows a situation when the table 35 is seen through a window part 43 by an operator from a position which allows operation of the operation panel 42. The B-axis as the rotary feed axis about the axis line parallel to the Y-axis is set. The table 35 is provided on the swivel base 37 which rotates in the B-axis direction. The C-axis as the rotary feed axis about the axis line extending perpendicularly to the workpiece attachment surface 35a of the table 35 is set. When the table 35 rotates in the B-axis direction, the axis line of the C-axis also rotates about the axis line of the B-axis. Such a machine tool in which the axis line of the C-axis is arranged on the axis line of the B-axis is referred to as a machine tool of type B in the present invention.

Machine tools in which an axis line of a rotary feed axis is set parallel to a linear motion axis as in the machine tool of the reference example have been conventionally used. In the machine tool of the reference example, the workpiece 1 rotates about the axis line parallel to the linear motion axis. Therefore, with the machine tool of type A, for example, the orientation of the workpiece 1 can be easily checked with the coordinate value of the A-axis and the coordinate value of the C-axis of the machine coordinate system. In addition, the direction of rotary movement of the workpiece 1 or the intended coordinate value of the A-axis and coordinate value of the C-axis can be easily estimated.

The control device of the machine tool of the present embodiment performs and controls display of the coordinate value so as to resemble the machine tool of the reference example in the feel of operation. In the present embodiment, a control device of a machine tool corresponding to the machine tool of type B of the reference example, out of the machine tool of type A and the machine tool of type B of the reference example, will be described.

In the control device of the machine tool of the present embodiment, a coordinate system with the workpiece attachment surface 35a of the table 35 as the reference is set, in addition to the machine coordinate system. In the present invention, the coordinate system is referred to as table coordinate system.

Figure 6:
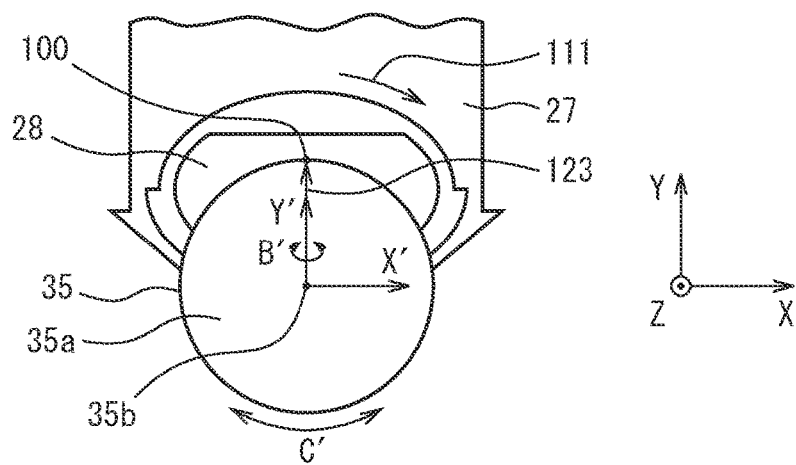
FIG. 6 is a first schematic plan view of a table illustrating a table coordinate system of Embodiment 1.

Referring to FIG. 6 to FIG. 9, the table coordinate system will be described. FIG. 6 shows a first schematic plan view of the table of the machine tool of the present embodiment. FIG. 6 shows the reference state. The workpiece attachment surface 35a of the table 35 is parallel to the XY-plane in the machine coordinate system. In the present embodiment, the origin of the table coordinate system is set to the center 35b of the workpiece attachment surface 35a.

The table coordinate system includes the X'-axis, the Y'-axis, and the Z'-axis as virtual linear motion axes orthogonal to each other. The X'-axis corresponds to a first virtual linear motion axis, the Y'-axis corresponds to a second virtual linear motion axis, and the Z'-axis corresponds to a third virtual linear motion axis. Referring to FIG. 1, FIG. 2, and FIG. 6, the X'-axis of the table coordinate system is parallel to the X-axis of the machine coordinate system, in the reference state. In the reference state, the Y'-axis of the table coordinate system is parallel to the Y-axis of the machine coordinate system. Further, in the reference state, the Z'-axis of the table coordinate system is parallel to the Z-axis of the machine coordinate system.

The table coordinate system includes the B'-axis and the C'-axis as virtual rotary feed axes. The B'-axis of the table coordinate system is a rotary feed axis about an axis line parallel to the Y'-axis. The B'-axis of the present embodiment is set about the Y'-axis, the Y'-axis being the axis line. The Y'-axis corresponds to a first virtual axis line, and the B'-axis corresponds to a first virtual rotary feed axis. With an axis line being a normal of the workpiece attachment surface 35a passing through the center 35b which is the center of rotation, the C'-axis of the table coordinate system is set about the normal. The normal of the workpiece attachment surface 35a passing through the center 35b corresponds to a second virtual axis line, and the C'-axis corresponds to a second virtual rotary feed axis.

Next, from the reference state, the inclination swivel base 28 is rotated in the direction depicted by an arrow 111. Rotary movement of the inclination swivel base 28 is in the negative direction of the B-axis of the machine coordinate system.

Figure 7:
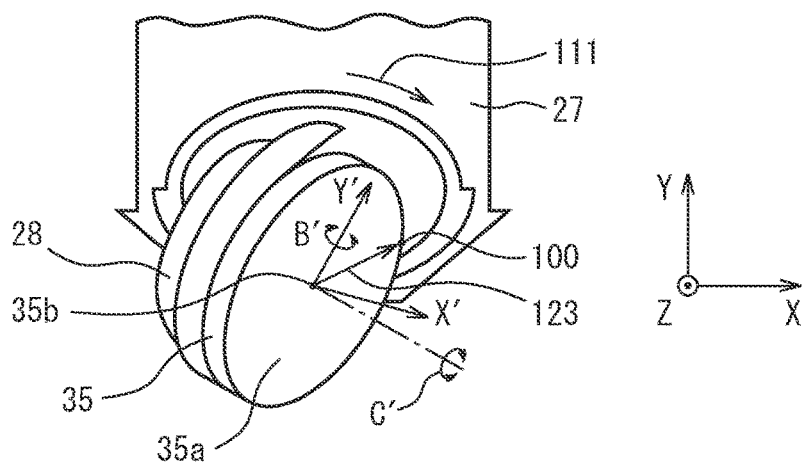
FIG. 7 is a second schematic plan view of the table illustrating the table coordinate system of Embodiment 1.

FIG. 7 shows a second schematic plan view of the table upon rotation of the inclination swivel base in the B-axis direction from the reference state. FIG. 7 shows a state during a period of movement in the B-axis direction. The state is such that the workpiece attachment surface 35a is inclined with respect to all linear motion axes of the machine coordinate system. The Z'-axis of the table coordinate system is maintained constant in orientation even when the workpiece attachment surface 35a has moved. Since the machine tool of the present embodiment is made to correspond to the machine tool of type B of the reference example, the Z'-axis moves together with the workpiece attachment surface 35a while remaining parallel to the Z-axis of the machine coordinate system. The X'-axis and the Y'-axis of the table coordinate system move within a plane perpendicular to the Z'-axis. In other words, movement is within a plane parallel to the XY-plane of the machine coordinate system. The X'-axis and the Y'-axis change in orientation along with the rotary movement of the workpiece attachment surface 35a.

The Y'-axis of the table coordinate system is set on the workpiece attachment surface 35a even upon rotation of the table 35 in the B-axis direction. The Y'-axis moves while remaining parallel to the workpiece attachment surface 35a. In the present embodiment, the Y'-axis moves in contact with the workpiece attachment surface 35a. In contrast, the X'-axis moves, remaining orthogonal to the Y'-axis within a plane perpendicular to the Z'-axis. While the X'-axis has been arranged on the workpiece attachment surface 35a in the reference state, the X'-axis departs from the workpiece attachment surface 35a along with the rotary movement in the B-axis direction.

Figure 8:
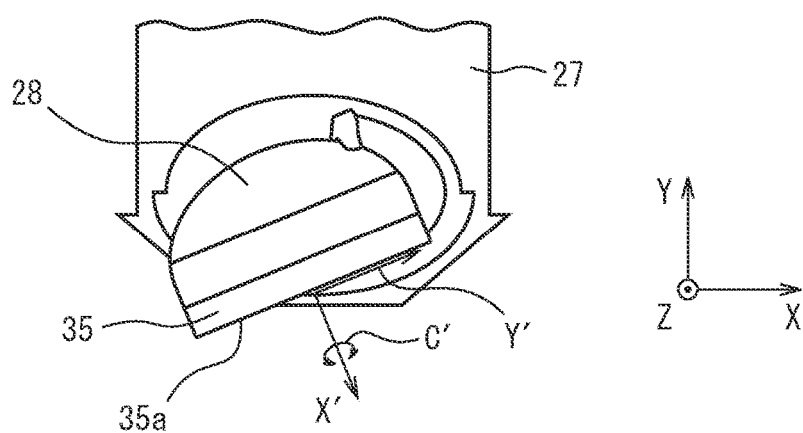
FIG. 8 is a third schematic plan view of the table illustrating the table coordinate system of Embodiment 1.
Figure 9:
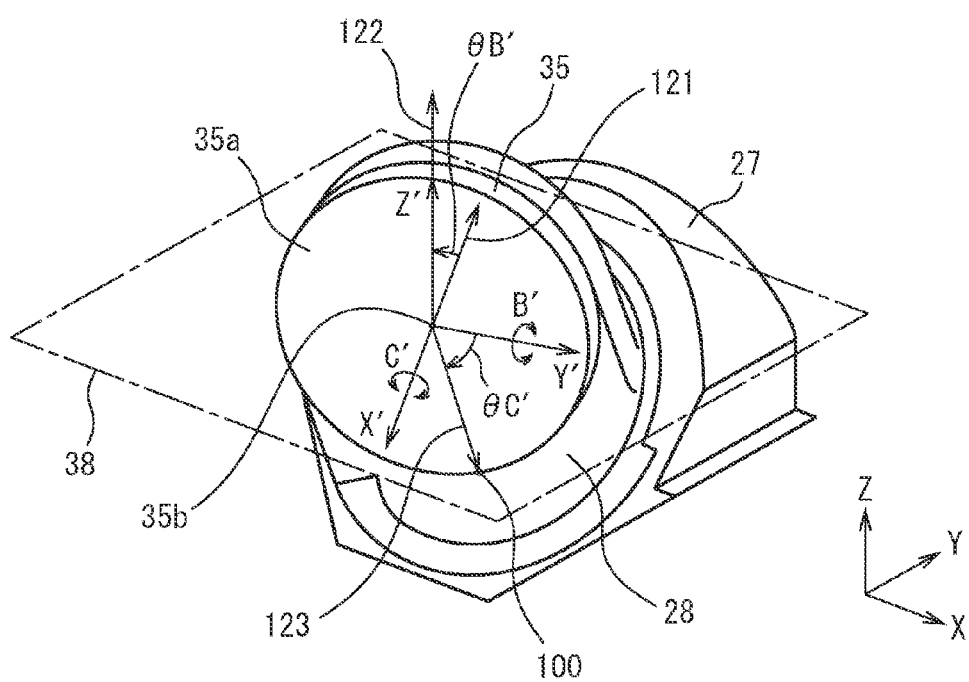
FIG. 9 is a schematic perspective view of the table illustrating the table coordinate system in Embodiment 1.

FIG. 8 shows a third schematic plan view of the table when further rotated in the B-axis direction from the state during the period of movement in the B-axis direction. FIG. 8 shows a state in which the movement in the B-axis direction has been terminated and the workpiece attachment surface 35a has become vertical. FIG. 9 shows a perspective view of the table, showing a state in which the movement in the B-axis direction has been terminated. Referring to FIG. 8 and FIG. 9, the workpiece attachment surface 35a of the table 35 is parallel to the Z-axis of the machine coordinate system, i.e., parallel to the vertical direction.

The X'-axis and the Y'-axis of the table coordinate system are arranged on the plane 38 parallel to the XY-plane of the machine coordinate system. The Y'-axis of the table coordinate system is arranged on the workpiece attachment surface 35a. In contrast, the X'-axis of the table coordinate system is perpendicular to the workpiece attachment surface 35a.

Next, referring to FIG. 6, regarding the rotary feed axis, the axis line of the B'-axis of the table coordinate system is the Y'-axis. When the inclination swivel base 28 rotates in the B-axis direction, the axis line of the B'-axis also rotates. Referring to FIG. 9, a rotation angle $\theta B'$ in the B'-axis direction corresponds to the angle by which the workpiece attachment surface 35a has rotated about the Y'-axis. The rotation angle $\theta B'$ in the B'-axis direction is depicted by the angle between an arrow 121 and an arrow 122. The rotation angle $\theta B'$ in the B'-axis direction corresponds to the angle of the workpiece attachment surface 35a with respect to a plane perpendicular to the Z'-axis of the table coordinate system. The coordinate value of the B'-axis corresponds to the rotation angle $\theta B'$ of the B'-axis. In an example shown in FIG. 8 and FIG. 9, the coordinate value of the B'-axis is −90°.

Next, the axis line of the C'-axis of the table coordinate system moves together with the workpiece attachment surface 35a. Referring to FIG. 6, the axis line of the C'-axis is the Z'-axis, in the reference state. A reference point 100 is fixed to the workpiece attachment surface 35a. The reference point 100 is arranged on the Y'-axis of the table coordinate system. The direction toward the reference point 100 from the center 35b is depicted by an arrow 123. The arrow 123 corresponds to a reference line. The reference line is fixed to the workpiece attachment surface 35a.

Referring to FIG. 7, the reference point 100 moves along with the rotation of the inclination swivel base 28 in the direction of the arrow 111. Further, in a state shown in FIG. 8 and FIG. 9 in which the movement in the B-axis direction has been terminated, the reference point 100 is in a lower position of the workpiece attachment surface 35a. The axis line of the C'-axis is the X'-axis. In this manner, along with the rotary movement of the inclination swivel base 28, the workpiece attachment surface 35a apparently rotates. The coordinate value of the C'-axis changes in correspondence with the rotation angle in the B-axis direction upon the table 35 having rotated in the B-axis direction. A rotation angle $\theta C'$ of the C'-axis corresponds to the angle of the reference line depicted by the arrow 123 with respect to the Y'-axis. The coordinate value of the C'-axis corresponds to the rotation angle $\theta C'$ of the C'-axis. When rotation has taken place in the B-axis direction in the machine tool of type B of the reference example, the reference point 100 and the arrow 123 are present within a plane parallel to the XY-plane. The rotation angle $\theta C'$ of the C'-axis denotes the angle of displacement from a direction present within the plane.

By setting the coordinate value of the B'-axis (rotation angle in the B'-axis direction) in the table coordinate system, the inclination of the workpiece attachment surface 35a can be determined easily. For example, when the coordinate value of the B'-axis is 0°, the workpiece attachment surface 35a is parallel to the XY-plane. Further, when the coordinate value of the B'-axis is −90°, the workpiece attachment surface 35a is perpendicular with respect to the XY-plane. By setting the coordinate value of the C'-axis (rotation angle in the C'-axis direction), the inclination of the workpiece 1 on the workpiece attachment surface 35a can be set easily.

Particularly, a portion of the workpiece to be machined can be turned to face the tool easily. In addition, through operation while looking at the coordinate value of the table coordinate system, the workpiece can be turned to face a desired direction by an operation similar to the machine tool of type B of the reference example.

Next, for the machine tool of the present embodiment, a more specific control example will be introduced and described. A control example in which the orientation of a workpiece is adjusted manually will be described below.

Figure 10:
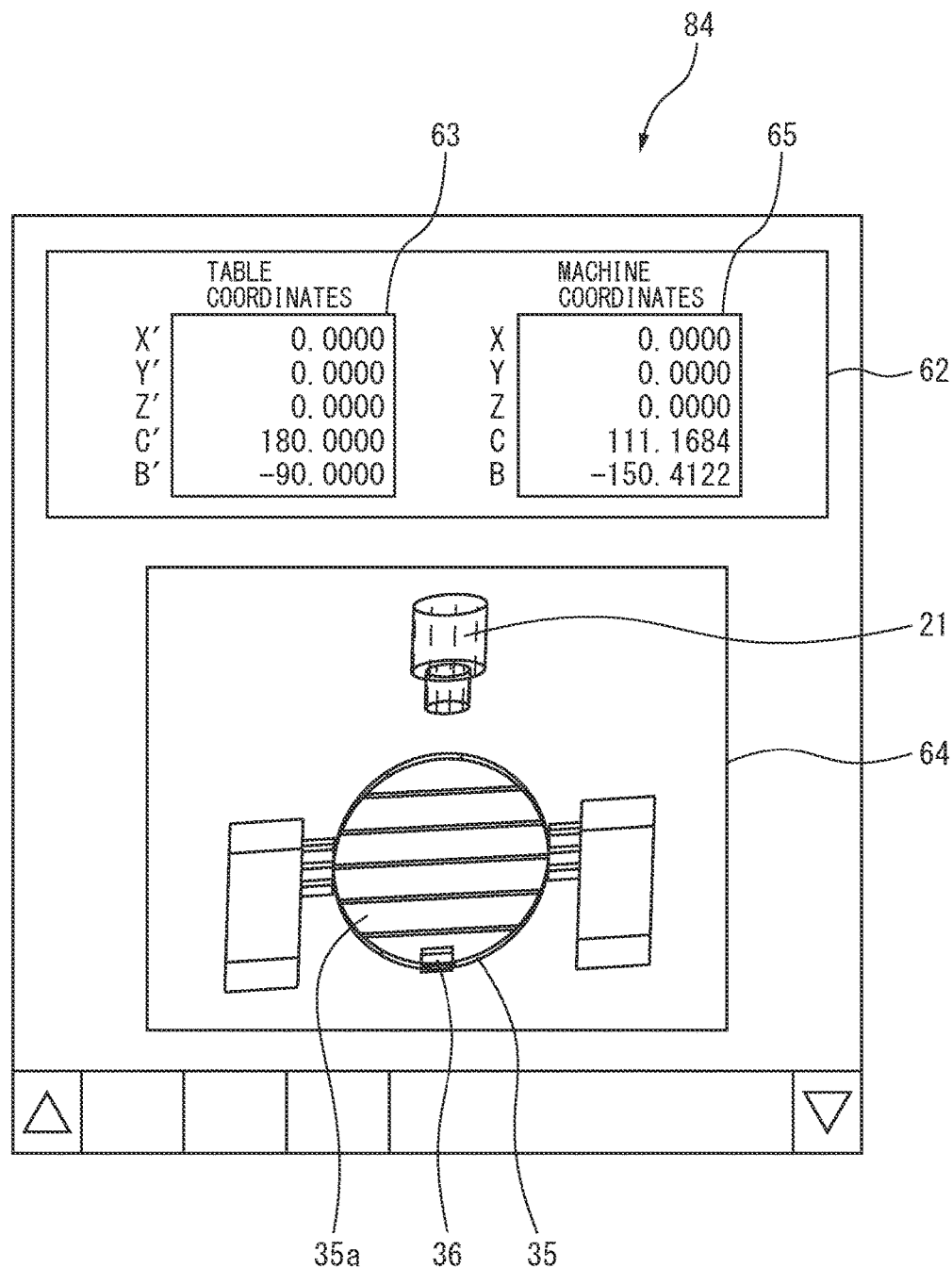
FIG. 10 is a schematic view of a display unit of a control device in Embodiment 1.

FIG. 10 is a schematic view of the display unit in the operation panel of the machine tool of the present embodiment. The display unit 84 includes a coordinate display unit 62 to display the coordinate value of the machine coordinate system and the coordinate value of the table coordinate system. The coordinate display unit 62 includes a machine coordinate display unit 65 to display the machine coordinates. In the machine coordinate display unit 65, the coordinate values of the X-axis, the Y-axis, the Z-axis, the C-axis, and the B-axis are displayed. Further, the coordinate display unit 62 includes a table coordinate display unit 63 to display the table coordinates. In the table coordinate display unit 63, the coordinate values of the X'-axis, the Y'-axis, the Z'-axis, the C'-axis, and the B'-axis are displayed.

The coordinate values of the three linear motion axes of the X'-axis, the Y'-axis, and the Z'-axis of the table coordinate system are determined by the amount of movement in the respective linear motion axes, when any of the X-axis servomotor, the Y-axis servomotor, and the Z-axis servomotor of the machine coordinate system has been driven. In the present embodiment, relative movement of the table is not in the direction of the linear motion axis. Therefore, the coordinate values of the linear motion axes of the table coordinate system and the coordinate values of the linear motion axes of the machine coordinate system are all zero.

The display unit 84 includes a schematic-view display unit 64. In the schematic-view display unit 64, a schematic view of the machine tool of type B of the reference example is depicted. In other words, a schematic view of the machine tool provided with the B-axis about the axis line parallel to the Y-axis is depicted. Control of display with the schematic-view display unit 64 will be described later.

Next, referring to FIG. 11 to FIG. 17, a first control in the present embodiment will be described. In the first control, rotary movement in the B-axis direction and rotary movement in the C-axis direction are not performed simultaneously, but implemented independently.

Figure 11:
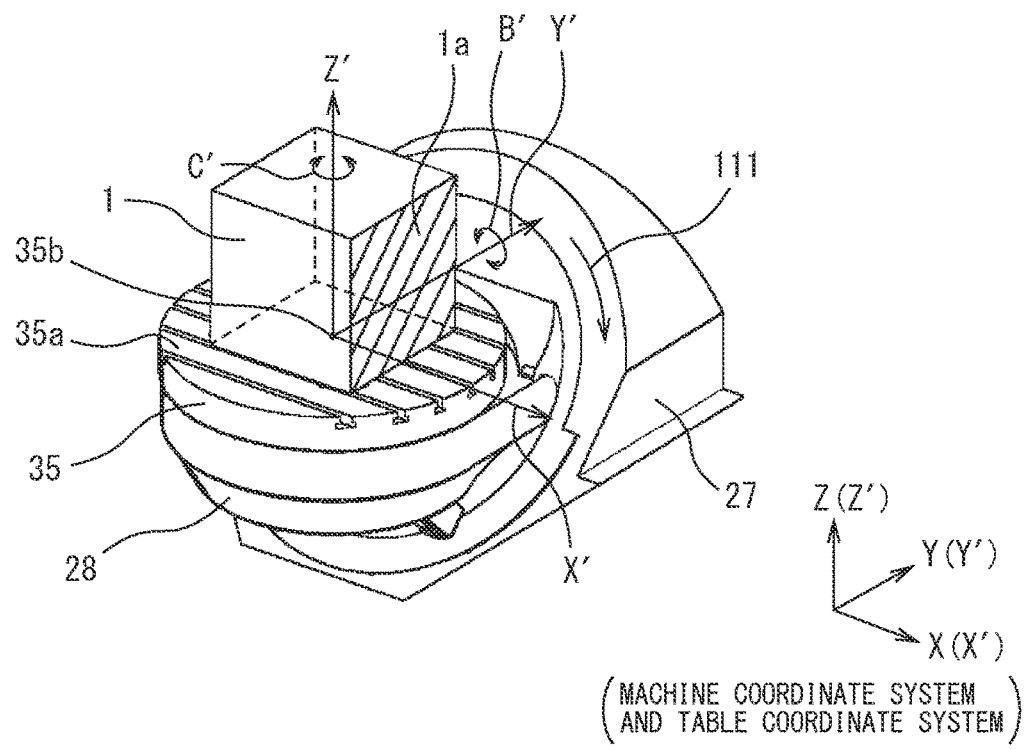
FIG. 11 is a schematic perspective view of the table and a workpiece in a first step of a first control of Embodiment 1.

FIG. 11 is a schematic perspective view of the table and the workpiece in the reference state. In the present embodiment, the cubic workpiece 1 will be taken as an example and described. In the workpiece 1, a machining target surface 1a on which machining is to be performed with the tool is set. The workpiece 1 is rotated manually from the reference state so that the machining target surface 1a faces the positive side of the Z-axis of the machine coordinate system. The workpiece attachment surface 35a is perpendicular to the Z'-axis direction.

As described above, the X'-axis, the Y'-axis, and the Z'-axis of the table coordinate system are orthogonal to each other, and the axis line of the B'-axis is set to the Y'-axis. Further, in the reference state, the axis line of the C'-axis is set to the Z'-axis.

Figure 12:
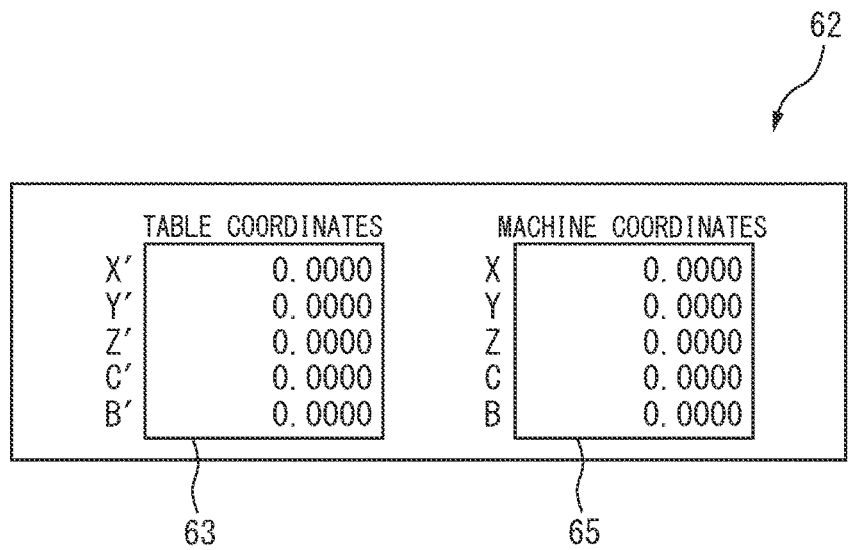
FIG. 12 is a coordinate display unit in the first step of the first control of Embodiment 1.

FIG. 12 is the coordinate display unit of the display unit in the reference state. All coordinate values of the table coordinate system and all coordinate values of the machine coordinate system are zero. Through operation of the input unit 78, an operator moves the inclination swivel base 28 in the negative direction of the B-axis depicted by the arrow 111. By operating the input unit 78 of the manual pulse generator 79 or the like arranged at the operation panel, the inclination swivel base 28 is rotated.

Figure 13:
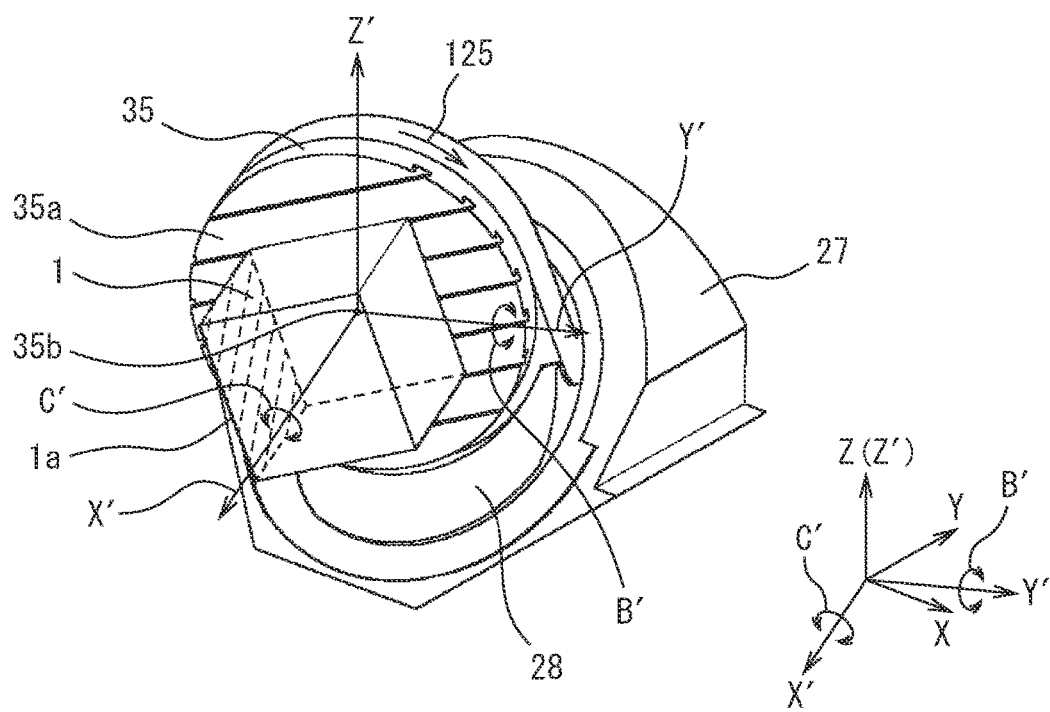
FIG. 13 is a schematic perspective view of the table and the workpiece in a second step of the first control of Embodiment 1.
Figure 14:
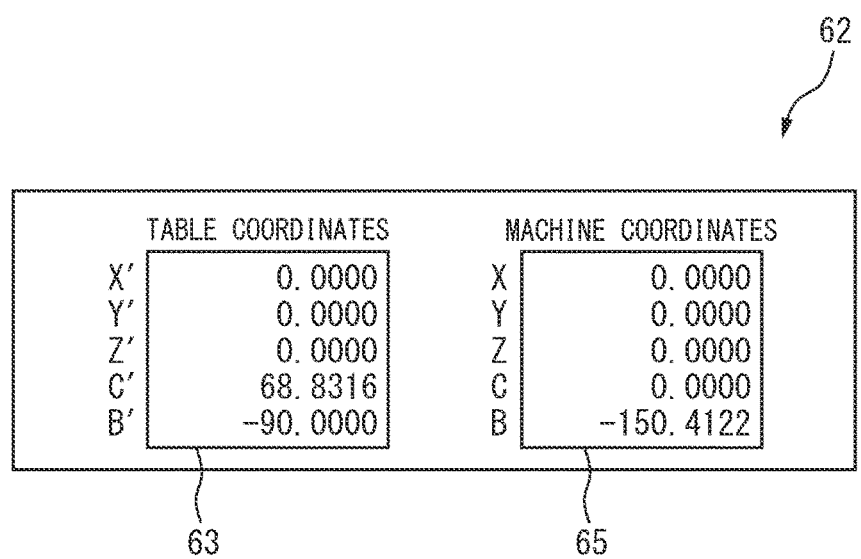
FIG. 14 is the coordinate display unit in the second step of the first control of Embodiment 1.

FIG. 13 shows a schematic perspective view of the table and the workpiece in the intermediate state in which rotary movement of the inclination swivel base from the reference state has been terminated and the workpiece attachment surface has become vertical. FIG. 14 shows the coordinate display unit in the intermediate state. In the intermediate state, the workpiece attachment surface 35a is parallel to the Z'-axis direction of the table coordinate system. The Y'-axis of the table coordinate system at this time is present on a line of intersection of a plane parallel to the XY-plane passing through the center 35b and the workpiece attachment surface 35a. The B'-axis is the rotary feed axis about the Y'-axis. The axis line of the C'-axis which is the rotary feed axis in which the table 35 itself rotates is the X'-axis. In other words, in the intermediate state, the C'-axis is the rotary feed axis about the X'-axis.

Figure 15:
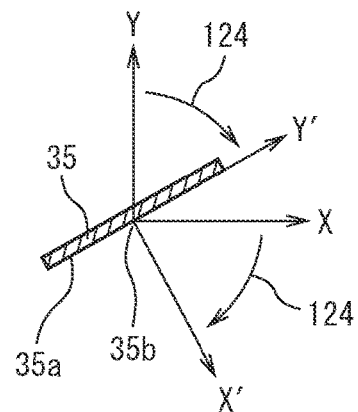
FIG. 15 is a schematic plan view showing movement of the X'-axis and the Y'-axis in the first control of Embodiment 1.

FIG. 15 shows a schematic plan view illustrating rotary movement of the X'-axis and the Y'-axis of the table coordinate system. In the reference state, the X-axis of the machine coordinate system and the X'-axis of the table coordinate system are parallel. In addition, the Y-axis of the machine coordinate system and the Y'-axis of the table coordinate system are parallel. By rotating the inclination swivel base 28, the X'-axis and the Y'-axis of the table coordinate system rotate together with the workpiece attachment surface 35a of the table 35, as depicted by an arrow 124. At this time, the Y'-axis rotates while maintaining contact with the workpiece attachment surface 35a. The X'-axis rotates while maintaining an angle of 90° with respect to the Y'-axis.

Referring to FIG. 14, the machine coordinates other than the coordinate value of the B-axis are zero, when rotary movement has taken place in the B-axis direction of the machine coordinate system from the reference state. Regardless of the workpiece attachment surface 35a being parallel to the Z-axis, the coordinate value of the B-axis of the machine coordinate system is not an easily recognizable angle, such as 90° or 45°, but a complicated value. In this manner, upon moving the workpiece attachment surface 35a from the horizontal state to the vertical state, it is difficult to recognize the orientation of the workpiece attachment surface 35a through referencing the coordinate value of the machine coordinate system. However, because the coordinate value of the B'-axis of the table coordinate system denotes the angle of the workpiece attachment surface 35a with respect to the XY-plane, the inclination angle of the workpiece attachment surface 35a can be easily set to a desired angle. In the present embodiment, an operator can easily make the workpiece attachment surface 35a parallel to the Z-axis by paying attention to the coordinate value of the B'-axis and rotating the inclination swivel base 28 up to −90°.

In the intermediate state in which the rotary movement in the B-axis direction has been terminated, the machining target surface 1a of the workpiece 1 is not facing the positive side of the Z-axis. Thus, as depicted by an arrow 125, the table 35 is rotated in the C-axis direction. Through operation of the input unit 78 arranged at the operation panel 42, the table 35 is rotated in the C-axis direction of the machine coordinate system. The arrow 125 denotes the positive direction of rotation in the C-axis of the present embodiment.

Figure 16:
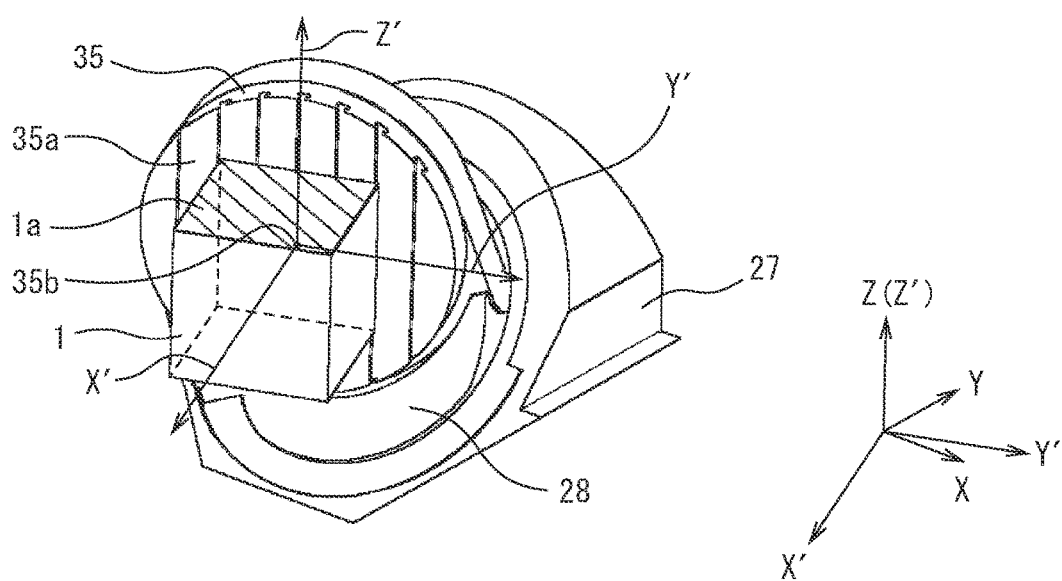
FIG. 16 is a schematic perspective view of the table and the workpiece in a third step of the first control of Embodiment 1.

FIG. 16 shows a schematic perspective view of the table and the workpiece in the final state in which the rotary movement of the table in the C-axis direction has been terminated. FIG. 17 shows the coordinate display unit in the final state. In the final state, the machining target surface 1a is facing the positive side of the Z-axis. In other words, the machining target surface 1a is facing the tool 41 and perpendicular to the axis line 25a of the spindle 25.

Referring to FIG. 14 and FIG. 17, the coordinate value of the C-axis of the machine coordinate system increases through rotation of the table 35 in the C-axis direction. Further, the coordinate value of the C'-axis of the table coordinate system increases. When the orientation of the workpiece is adjusted so that the machining target surface 1a faces the positive side of the Z-axis, the coordinate value of the C-axis of the machine coordinate system is a complicated value. However, the coordinate value of the C'-axis of the table coordinate system is 180°. Therefore, when rotating the table in the C-axis direction of the machine coordinate system, the orientation of the workpiece can be easily adjusted by causing movement while checking the coordinate value of the C'-axis. The machining target surface 1a of the workpiece 1 can be turned to face the positive direction of the Z-axis by causing rotary movement in the C-axis direction so that the coordinate value of the C'-axis of the table coordinate system becomes 180°.

The B'-axis of the table coordinate system of the present embodiment corresponds to the B-axis of the machine tool of type B (see FIG. 5) of the reference example. The C'-axis of the table coordinate system corresponds to the C-axis of the machine tool of type B. The coordinate value of the B'-axis and the coordinate value of the C'-axis of the table coordinate system correspond to the coordinate value of the B-axis and the coordinate value of the C-axis when rotary movement has taken place in the B-axis direction and the C-axis direction in the machine tool of type B of the reference example. Therefore, through operation while checking the coordinate value of the B'-axis and the coordinate value of the C'-axis of the table coordinate system, the orientation of the workpiece can be adjusted with a feel of operation similar to the machine tool of type B. Particularly, a portion of the workpiece 1 to be machined can be turned to face the tool 41 with a feel of operation similar to the machine tool of type B.

For example, comparing the state of the workpiece which has been rotated −90° in the B-axis direction and 180° in the C-axis direction in the machine tool of type B and the final state shown in FIG. 16, it can be seen that the machining target surface 1a is facing the positive side of the Z-axis after both movements. In the final state shown in FIG. 16, movement similar to the machine tool of type B of the reference example has been implemented, although the workpiece 1 is displaced with respect to the X-axis and the Y-axis of the machine coordinate system in planar view.

In this manner, by using the coordinate value of the B'-axis and the coordinate value of the C'-axis of the table coordinate system, the orientation of the workpiece can be easily estimated or set. When bringing the workpiece to a desired orientation, it suffices to set the coordinate value of the B'-axis and the coordinate value of the C'-axis with the machine tool of type B of the reference example in mind. Therefore, the orientation of the workpiece can be easily estimated or set. Particularly, a portion such as the machining target surface 1a of the workpiece 1 to be machined can be easily turned to face the tool 41.

Next, referring to FIG. 18 to FIG. 21, a second control in the present embodiment will be described. In the second control, upon manual rotary movement in the B-axis direction, the control device controls rotary movement in the C-axis direction so that the motion of the workpiece is closer to the machine tool of type B of the reference example than in the first control.

Figure 19:
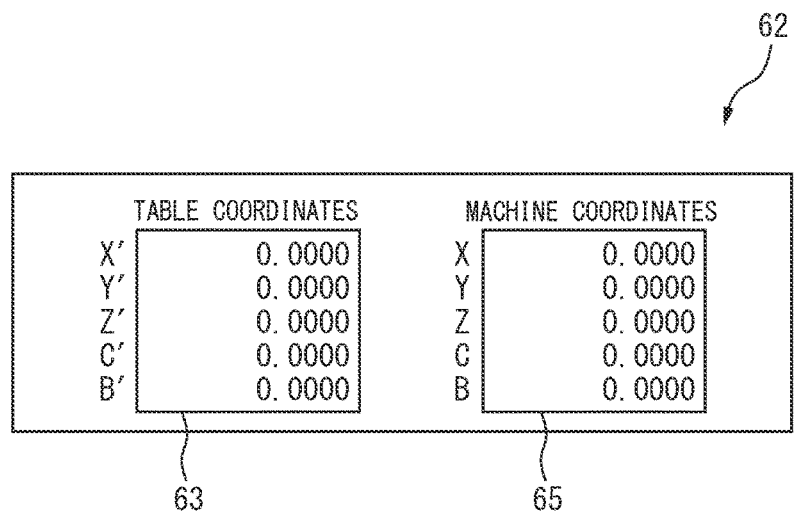
FIG. 19 is the coordinate display unit in the first step of the second control of Embodiment 1.

FIG. 18 shows a schematic perspective view of the table of the machine tool and the workpiece in the reference state. FIG. 19 shows the coordinate display unit of the display unit in the reference state. In the workpiece 1, the machining target surface 1a and a reference surface 1b upon movement are set. Referring to FIG. 5, in the machine tool of type B of the reference example, a state in which a predetermined surface of the cubic workpiece 1 is perpendicular to the Y-axis of the machine coordinate system is maintained, during a period in which the table 35 is rotated in the B-axis direction. However, referring to FIG. 13, all surfaces of the workpiece 1 are not perpendicular to the Y'-axis of the table coordinate system, but inclined, in the intermediate state of the first control. In the second control, control of altering such inclination of the workpiece is performed when the table is rotated in the B-axis direction.

Referring to FIG. 18, the inclination swivel base 28 is manually rotated in the negative direction of the B-axis, as depicted by the arrow 111, also in the second control. At this time, the control device calculates the rotation angle in the C-axis direction on the basis of the rotation angle in the B-axis direction. The control device automatically performs rotary movement in the negative direction of the C-axis, as depicted by an arrow 126. In the second control, rotary movement is in the C-axis direction so that the reference surface 1b is faces a predetermined direction in the table coordinate system.

In the present embodiment, a state in which the reference surface 1b of the workpiece 1 faces the negative direction of the Y'-axis is maintained. In other words, the reference surface 1b remains perpendicular to the Y'-axis. The reference surface 1b also remains perpendicular with respect to the XY-plane. By rotating the table 35 in the negative direction of the C'-axis, as depicted by the arrow 126, in correspondence with the rotation angle in the B'-axis direction, the orientation of the reference surface 1b can be maintained. For the second control as well, illustrated is an example of control in which rotation is by −90° in the B'-axis direction of the table coordinate system.

Figure 20:
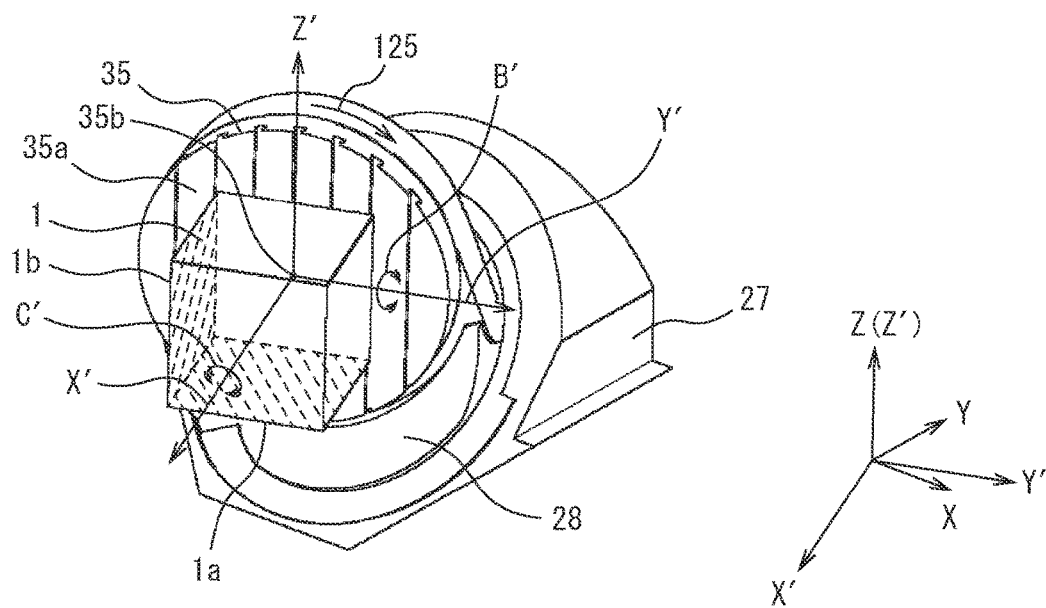
FIG. 20 is a schematic perspective view of the table and the workpiece in a second step of the second control of Embodiment 1.
Figures 21, 22:
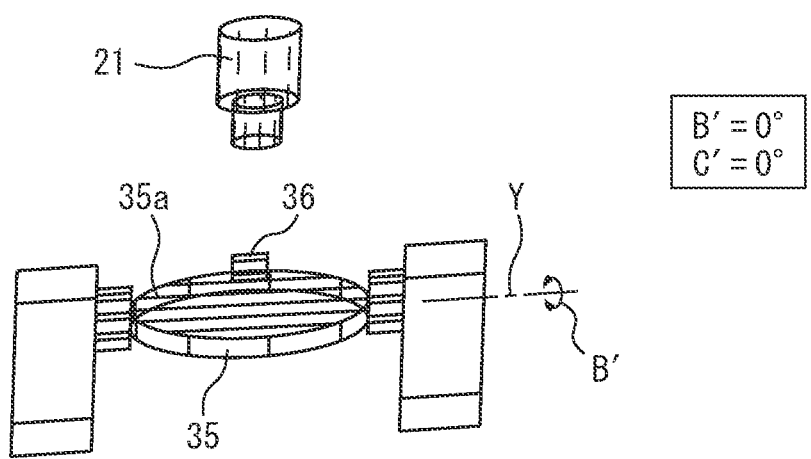
FIG. 21 is the coordinate display unit in the second step of the second control of Embodiment 1.
FIG. 22 is a first schematic view displayed in a schematic-view display unit of Embodiment 1.

FIG. 20 shows a schematic perspective view of the workpiece and the table in the intermediate state of the second control. FIG. 21 shows the coordinate display unit in the intermediate state of the second control. In the intermediate state, the workpiece attachment surface 35a of the table 35 is parallel to the Z-axis of the machine coordinate system. Through comparison with the intermediate state of the first control depicted in FIG. 13, it can be seen that the reference surface 1b remains perpendicular to the Y'-axis. It can also be seen that the machining target surface 1a of the workpiece 1 is parallel to the XY-plane.

In this manner, in the second control, the table 35 is rotated in the C-axis so that a portion of the workpiece 1 specified in advance is maintained in an orientation specified in advance, upon rotating the table 35 in the B-axis direction of the machine coordinate system. When rotary movement of the table takes place in the B-axis direction, the arithmetic unit computes the rotation angle about the axis line of the C-axis in correspondence with the rotation angle about the axis line of the B-line. Along with the rotary movement of the table in the B-axis direction, the control device performs control of causing rotary movement of the table in the C-axis direction. In the present invention, the control is referred to as accompanying rotation control.

In the coordinate display unit 62 of the operation panel, the coordinate value of the B-axis and the coordinate value of the C-axis of the machine coordinate system change. For coordinate values of the table coordinate system, the coordinate value of the C'-axis is maintained at 0°, while the coordinate value of the B'-axis changes. In the accompanying rotation control, the table 35 is rotated in the C-axis direction so that the coordinate value of the C'-axis of the table coordinate system is maintained at a predetermined value.

By performing the second control, the machining target surface 1a becomes perpendicular to the Z-axis direction in the intermediate state. In other words, the orientation of the machining target surface 1a (normal direction of the machining target surface 1a) is the same as the orientation upon rotation by −90° in the B-axis direction in the machine tool of type B of the reference example.

Next, by rotating the table 35 in the positive direction of the C-axis as depicted by the arrow 125, the same state as the final state of the first control depicted in FIG. 16 and FIG. 17 can be brought about. The machining target surface 1a can be turned to face the tool 41.

In the second control, the table 35 rotates in the C-axis direction in accordance with the rotation angle of the inclination swivel base 28. The orientation of the machining target surface 1a is similar to the orientation upon the workpiece having rotated in the B-axis direction in the machine tool of type B of the reference example. Therefore, the inclination of the workpiece 1 can be easily controlled manually. The machining target surface 1a of the workpiece 1 can be turned to face the tool 41 easily. In this manner, by performing the second control, an operator can set the inclination of the workpiece 1 with a feel of operation resembling the machine tool of type B of the reference example.

Referring to FIG. 3, in a manual operation of the machine tool, an operator can indicate rotary movement of the table in any amount of movement about the axis line of any rotary feed axis, with the manual pulse generator 79 or the jog-feeding device 80 arranged at the operation panel.

The control device 70 of the present embodiment is formed so that the first control or the second control can be selected in advance. When the first control has been selected, the arithmetic unit 83 generates a movement instruction on the relative position of the tool 41 with respect to the workpiece 1, on the basis of movement information input with the input unit 78. The arithmetic unit 83 computes the coordinate value of the machine coordinate system and the coordinate value of the table coordinate system on the basis of movement information of each axis. The arithmetic unit 83 transmits the movement instruction to the interpolation arithmetic unit 73. In addition, the arithmetic unit 83 transmits the coordinate value of the machine coordinate system and the coordinate value of the table coordinate system to the display unit 84. The display unit 84 displays the coordinate values computed by the arithmetic unit 83.

When the second control has been selected, the arithmetic unit 83 sets, on the basis of movement information input with the input unit 78 for one rotary feed axis of which the axis line is inclined, movement information of a different rotary feed axis. For example, the amount of movement in the C-axis direction is calculated on the basis of the amount of movement in the B-axis direction. The arithmetic unit 83 generates a movement instruction on the relative position of the tool 41 with respect to the workpiece 1, for the plurality of rotary feed axes. The arithmetic unit 83 computes the coordinate value of the machine coordinate system and the coordinate value of the table coordinate system. In a similar manner to the first control, the arithmetic unit 83 transmits the movement instruction to the interpolation arithmetic unit 73. In addition, the arithmetic unit 83 transmits the coordinate value of the machine coordinate system and the coordinate value of the table coordinate system to the display unit 84.

In manual control of the machine tool, an operator can input an M code in advance to the control device 70 with the MDI device 81. In the MDI device 81 of the input unit 78 of the present embodiment, an M code based on the table coordinate system is specified in advance. Using the M code set in the machine tool, the arithmetic unit 83 can create a movement instruction to cause relative movement of the workpiece 1 with respect to the tool 41. Such an M code can be created as illustrated in the following expression (1), for example.

[Formula 1]

$$Mxxx\ Sy\ Tzzz \qquad (1)$$

where Mxxx: M code number
Sy: Argument of axis in movement instruction
1: Positive direction of first virtual rotary feed axis
2: Negative direction of first virtual rotary feed axis
3: Positive direction of second virtual rotary feed axis
4: Negative direction of second virtual rotary feed axis
Tzzz: Coordinate value In the present embodiment, the first virtual rotary feed axis is the B'-axis of the table coordinate system, and the second virtual rotary feed axis is the C'-axis of the table coordinate system. As an example of such an M code, "M1600" is a code to set the movement in each axis of the table coordinate system, and the input can be "M1600 S2 T90" when the intended coordinate value of the B'-axis is −90°.

When movement information has been input with the MDI device 81 of the input unit 78, the input movement information in M code is transmitted to the arithmetic unit 83. When the first control has been selected, the arithmetic unit 83 computes a movement instruction on one rotary feed axis of the machine coordinate system on the basis of the input M code for the table coordinate system. When the second control has been selected, the arithmetic unit 83 also computes a movement instruction on a different rotary feed axis, in addition to the movement instruction on the one inclined rotary feed axis. The arithmetic unit 83 transmits the movement instruction to the interpolation arithmetic unit 73. In addition, the arithmetic unit 83 computes and transmits, to the display unit 84, the coordinate value of the machine coordinate system and the coordinate value of the table coordinate system. The display unit 84 displays the coordinate values computed by the arithmetic unit 83.

The input unit 78 of the control device 70 in the present embodiment allows input of a control code for the rotary feed axis of the table coordinate system. The control device 70 implements rotary movement about the axis line of the rotary feed axis of the machine coordinate system on the basis of the control code. The control code of the present embodiment can set the orientation of the workpiece with respect to the tool with the coordinate value of the table coordinate system. Therefore, an operator can set the orientation of the workpiece with a feel of operation resembling the machine tool of type B of the reference example, without having to input the coordinate value of the machine coordinate system.

An example of calculation in the arithmetic unit 83 will be described. The table coordinate display unit 63 in the present embodiment displays the coordinate value of the table coordinate system, besides the machine coordinates. The arithmetic unit 83 can compute the coordinate value of the table coordinate system from the coordinate value of the machine coordinate system by using a rotation matrix. The arithmetic unit 83 calculates the coordinate value of the B'-axis and the coordinate value of the C'-axis of the table coordinate system when the inclination swivel base 28 has been rotated in the B-axis direction of the machine coordinate system.

In the arithmetic unit 83, a calculation coordinate system is set for calculation of the coordinate value of the table coordinate system. The calculation coordinate system includes the X"-axis, the Y"-axis, and the Z"-axis as linear motion axes orthogonal to each other. The three linear motion axes of the calculation coordinate system are fixed to the workpiece attachment surface 35*a* of the table 35 and move together with the workpiece attachment surface 35*a* of the table 35. Respective variables for calculating the coordinate value of the table coordinate system are as follows.

[Formula 2]

B: Rotation angle of B-axis of machine coordinate system
Bt: Inclination angle of axis line of B-axis of machine coordinate system
Xt=(Xtx, Xty, Xtz): Position of X"-axis reference point of calculation coordinate system upon B-axis rotation
Yt=(Ytx, Yty, Ytz): Position of Y"-axis reference point of calculation coordinate system upon B-axis rotation
Zt=(Ztx, Zty, Ztz): Position of Z"-axis reference point of calculation coordinate system upon B-axis rotation
Xb=(Xbx, Xby, Xbz): Position of X'-axis reference point of table coordinate system
θA': Rotation angle of A'-axis of table coordinate system
θB': Rotation angle of B'-axis of table coordinate system
θC': Rotation angle of C'-axis of table coordinate system Reference point Xt, reference point Yt, and reference point Zt are any point on the X"-axis, the Y"-axis, and the Z"-axis of the calculation coordinate system fixed on the table. For example, setting can be with a unit vector with a distance of 1 from the origin of the calculation coordinate system fixed on the table. In a similar manner, reference point Xb is any point on the X'-axis in the table coordinate system. Next, the coordinate value of reference point Zt of the Z"-axis fixed on the table when the table has rotated in the B-axis direction of the machine coordinate system can be represented by the following expression (2) to expression (4).

[Formula 3]

$$Z_{tx} = \cos Bt \times \sin B \quad (2)$$

$$Z_{ty} = \cos Bt \times \sin Bt(1 - \cos B) \quad (3)$$

$$Z_{tz} = \sin^2 Bt(1 - \cos B) + \cos B \quad (4)$$

The rotation angle θB' of the B'-axis of the table coordinate system can be denoted by the following expression (5).

[Formula 4]

$$\theta B' = \cos^{-1}(Z_{tz}) \quad (5)$$

The respective coordinate values of reference point Xt of the X"-axis and reference point Yt of the Y"-axis of the calculation coordinate system upon rotation in the B-axis direction are represented by the following expression (6) to expression (9). Further, the coordinate value of reference point Xb of the X'-axis in the table coordinate system can be represented by expression (10) and expression (11).

[Formula 5]

$$X_{tx} = \cos B \quad (6)$$

$$X_{ty} = \sin Bt \times \sin B \quad (7)$$

$$Y_{tx} = -\sin Bt \quad (8)$$

$$Y_{ty} = \cos^2 Bt(1 - \cos B) + \cos B \quad (9)$$

$$X_{bx} = -Z_{ty} \quad (10)$$

$$X_{by} = Z_{tx} \quad (11)$$

On the basis of the variables, the rotation angle θC' of the C'-axis in the table coordinate system can be represented by the following expression (12).

[Formula 6]

$$\theta C' = \cos^{-1}\left(\frac{Y_{tx} \times X_{bx} + Y_{ty} \times X_{by}}{\sqrt{\overline{Y}_t^2 + \overline{X}_b^2}}\right), \quad (12)$$

where $$\overline{Y}_t^2 = Y_{tx}^2 + Y_{ty}^2 + Y_{tz}^2$$

$$\overline{X}_b^2 = X_{bx}^2 + X_{by}^2 + X_{bz}^2$$

In this manner, in the arithmetic unit 83, the coordinate value of the machine coordinate system can be converted to the coordinate value of the table coordinate system. The arithmetic unit 83 can compute the coordinate value of the B'-axis and the coordinate value of the C'-axis of the table coordinate system corresponding to the coordinate value of the B-axis of the machine coordinate system. The arithmetic unit 83 can also convert the coordinate value of the table coordinate system to the coordinate value of the machine coordinate system, using a rotation matrix. The arithmetic unit 83 can calculate the coordinate value of the machine coordinate system and the coordinate value of the table coordinate system, on the basis of movement information input with the jog-feeding device 80 or the like of the input unit 78.

Referring to FIG. 10, the display unit 84 of the present embodiment includes the schematic-view display unit 64. The schematic-view display unit 64 displays a schematic view of the machine tool in which the axis line of the rotary feed axis is parallel to the linear motion axis. In an example shown in FIG. 10, the machine tool in which the axis line of the B-axis of the machine coordinate system is parallel to the Y-axis is depicted as the schematic view. In other words, the machine tool of type B of the reference example is depicted (see FIG. 5).

On the workpiece attachment surface 35*a*, a mark 36 for checking rotary movement in the C-axis direction is arranged. For the schematic view of the machine tool of the present embodiment, a view of the table 35 seen obliquely slightly from the upper side is drawn. A perspective view is shown so that the workpiece attachment surface 35*a* is slightly visible when the coordinate of the B-axis is 0°. In the schematic view, the position of the mark 36 arranged at the outer circumference of the table 35 when the coordinate of the B-axis is 0° can be checked.

Figure 23:
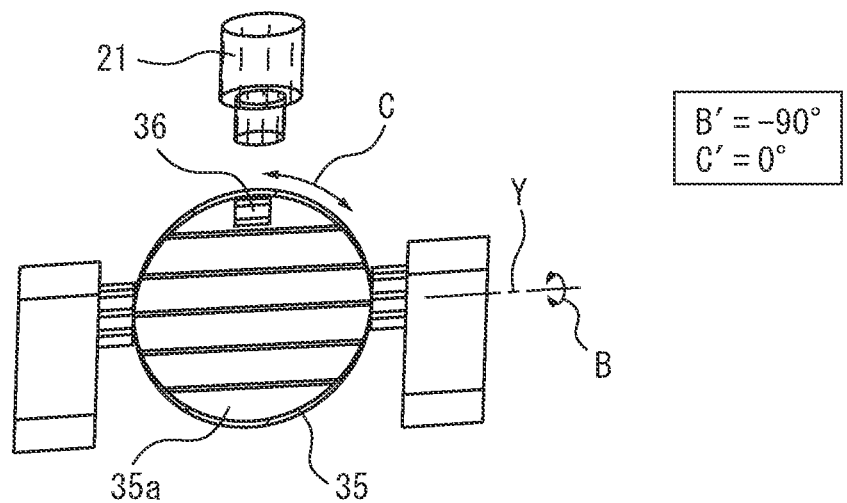
FIG. 23 is a second schematic view displayed in the schematic-view display unit of Embodiment 1.
Figure 24:
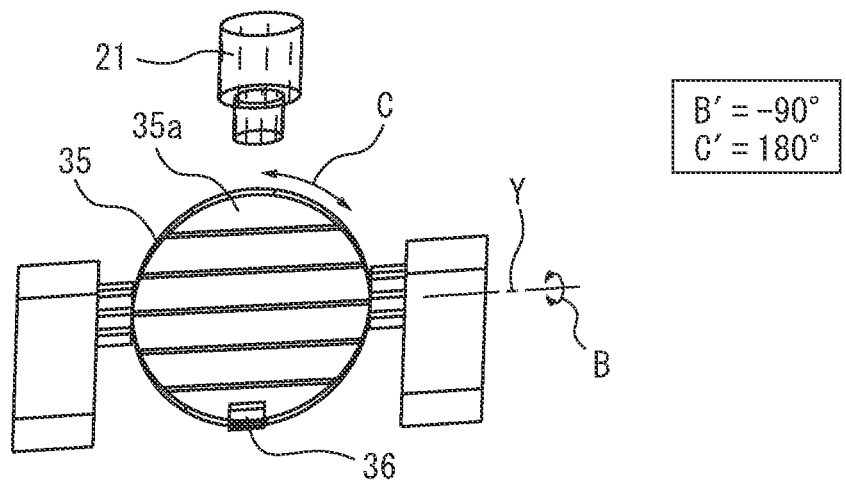
FIG. 24 is a third schematic view displayed in the schematic-view display unit of Embodiment 1.

FIG. 22 to FIG. 24 show schematic views upon rotary movement of the table 35 with the second control. FIG. 22 is a schematic view of the machine tool corresponding to the reference state. FIG. 23 is a schematic view of the machine tool corresponding to the intermediate state. Along with the rotary movement of the inclination swivel base 28 of the actual machine tool 11, the table 35 rotates in the direction of the B-axis of which the axis line is the Y-axis in the machine tool of the schematic view. In the intermediate state shown in FIG. 23, the workpiece attachment surface 35a of the table 35 extends in the vertical direction.

FIG. 24 shows a schematic view of the machine tool corresponding to the final state of the second control. By rotating the table 35 in the C-axis direction from the intermediate state in the actual machine tool 11, the table 35 rotates in the C-axis direction also in the machine tool of the schematic view. The mark 36 shifts from an upper-side position to a lower-side position, for example.

Through change in the schematic view along with the rotary movement of the table 35 of the machine tool 11, the situation at the time when the machine tool of the present embodiment is the machine tool of the reference example can be referenced. In the example, the machine tool of the present embodiment can be operated manually with a feel of operation similar to the machine tool of type B of the reference example. By referencing the schematic view, an operator can check the state of the table 35, i.e., the orientation of the workpiece 1. In this manner, an operator can check the orientation of the table 35 and the orientation of the workpiece with the schematic view along with the coordinate value of a workpiece coordinate system.

Figure 25:
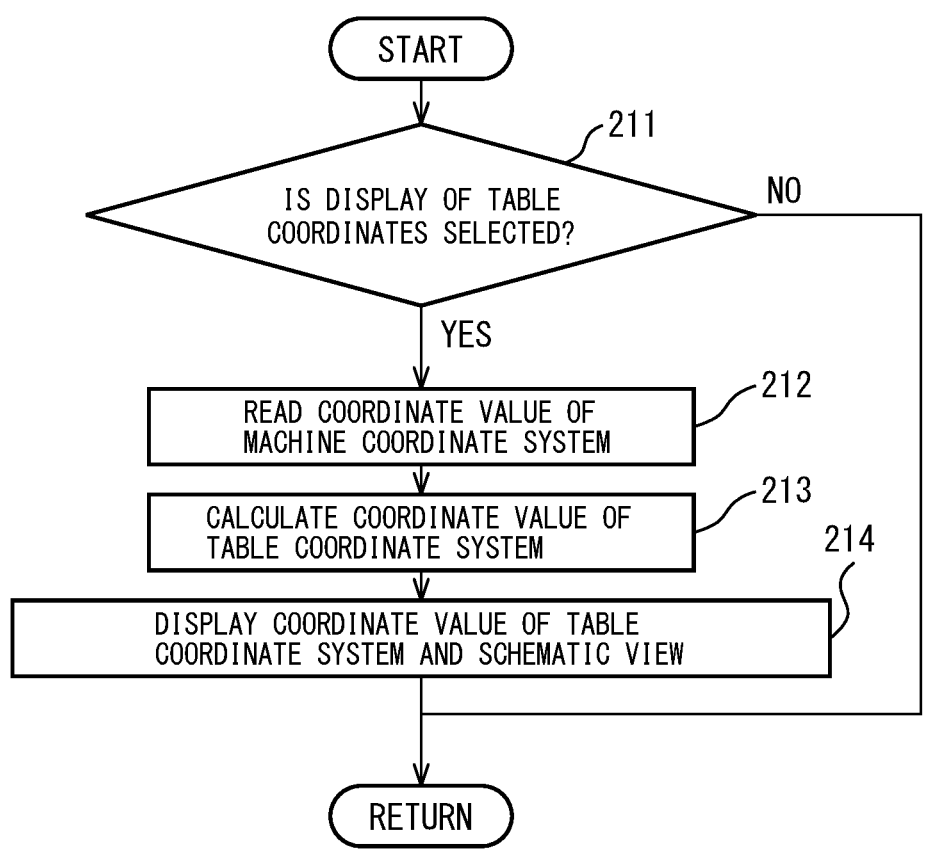
FIG. 25 is a flowchart illustrating control of the display unit upon moving the table manually.

FIG. 25 illustrates control of the display unit of the machine tool in the present embodiment. As a control when performing manual operation, one of the first control and the second control is selected by an operator in advance. In addition, whether or not to display the table coordinate system is selected by an operator in advance.

In step 211, whether or not to display the table coordinates in the display unit 84 is selected. When the table coordinates are not to be displayed in step 211, i.e., when only the machine coordinates are to be displayed, the control is terminated. When the table coordinates are to be displayed in step 211, it shifts to step 212. In step 212, the arithmetic unit 83 reads the current coordinate value of the machine coordinate system. The coordinate value of the machine coordinate system at this time may be a calculated value or the actual coordinate value of the machine coordinate system.

Next, in step 213, the arithmetic unit 83 calculates the coordinate value of the table coordinate system. In step 214, the coordinate value of the machine coordinate system, the coordinate value of the table coordinate system, and the schematic view of the machine tool of the reference example are displayed.

Such control can be performed for each time interval specified in advance. The display unit 84 of the control device 70 of the present embodiment updates the coordinate value of the table coordinate system and the coordinate value of the machine coordinate system also during a period of relative movement of the tool 41 with respect to the workpiece 1. Therefore, when the manual pulse generator 79 or the jog-feeding device 80 is used, an operator can implement the relative movement of the tool 41 with respect to the workpiece 1 while checking the coordinate value of the table coordinate system displayed in the display unit 84. When the MDI device 81 is used, the progress of the relative movement of the tool 41 with respect to the workpiece 1 can be checked.

Referring to FIG. 26 to FIG. 37, a control device of a machine tool in Embodiment 2 will be described. The control device of the machine tool of the present embodiment corresponds to the machine tool of type A of the reference example. The configuration in which the machine tool 11 includes three linear motion axes, a rotary feed axis serving as the B-axis of which an axis line is inclined, and a rotary feed axis serving as the C-axis is similar to Embodiment 1 (see FIG. 1 and FIG. 2).

Referring to FIG. 4, there are cases where an operator has been using the machine tool of type A of the reference example, before using the machine tool of which the axis line of the rotary feed axis is inclined. In such cases, it is preferable to perform and control display of the coordinate value so as to resemble the machine tool type A of the reference example in the feel of operation. In the control device of the machine tool of the present embodiment, a table coordinate system corresponding to the machine tool of type A is set.

Referring to FIG. 26 to FIG. 32, a first control of the present embodiment will be described. In the first control, rotation in the B-axis direction and rotation in the C-axis direction are implemented independently. An operator performs operation of turning the machining target surface 1a to face the tool 41. An operator inputs the relative position of the tool with respect to a workpiece manually through operation of the input unit 78 of the control device 70. In the first control, a table is rotated in the B-axis direction, and then the table is rotated in the C-axis direction.

Figures 26, 27:
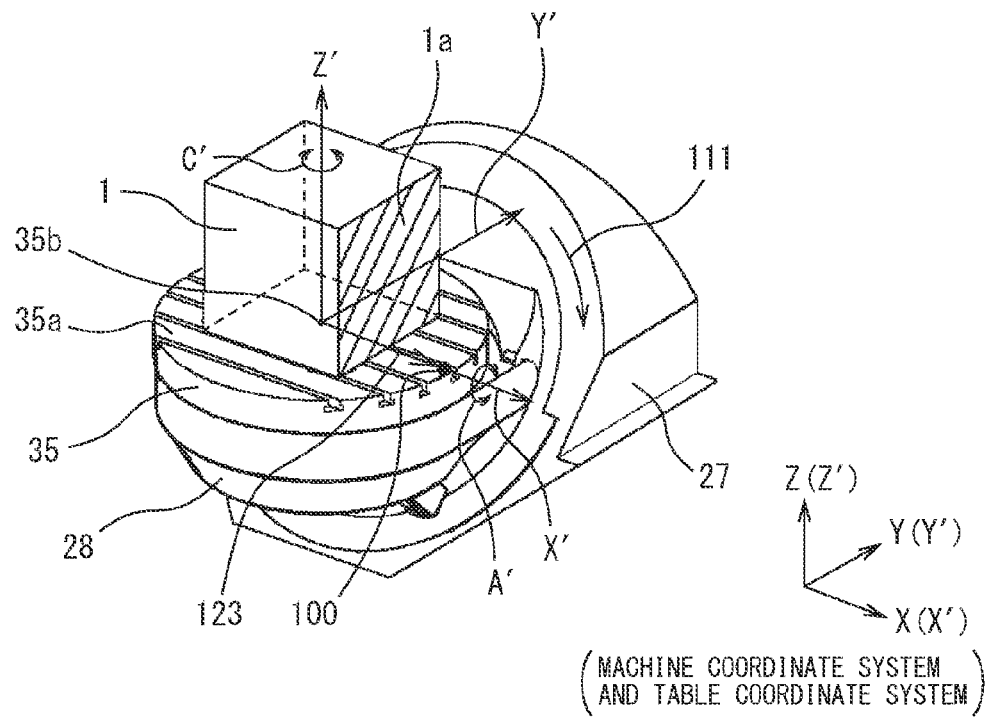
FIG. 26 is a schematic perspective view of a table and a workpiece in a first step of a first control of Embodiment 2.
FIG. 27 is a coordinate display unit in the first step of the first control of Embodiment 2.

FIG. 26 shows a schematic perspective view of the workpiece and the table in the reference state. FIG. 27 shows a coordinate display unit in the reference state. The table coordinate system of the present embodiment includes the X'-axis as a first virtual linear motion axis, the Y'-axis as a second virtual linear motion axis, and the Z'-axis as a third virtual linear motion axis. In the present embodiment, the table 35 rotates in a state in which the X'-axis is in contact with the workpiece attachment surface 35a.

The table coordinate system of the present embodiment includes the C'-axis and the A'-axis as virtual rotary feed axes. The A'-axis is a rotary feed axis of which an axis line is a line parallel to the X'-axis of the table coordinate system. In the present embodiment, the X'-axis of the table coordinate system is the axis line of the A'-axis. The X'-axis of the table coordinate system corresponds to a first virtual axis line, and the A'-axis corresponds to a first virtual rotary feed axis. The C'-axis of the table coordinate system is similar to Embodiment 1. The normal of the workpiece attachment surface 35a passing through the center 35b corresponds to a second virtual axis line, and the C'-axis corresponds to a second virtual rotary feed axis.

In the table coordinate display unit 63 of the coordinate display unit 62, the coordinate value of the C'-axis and the coordinate value of the A'-axis are displayed. An operator rotates the inclination swivel base 28 in the negative direction of the B-axis of the machine coordinate system manually, as depicted by the arrow 111, through operation of the input unit 78.

Figure 28:
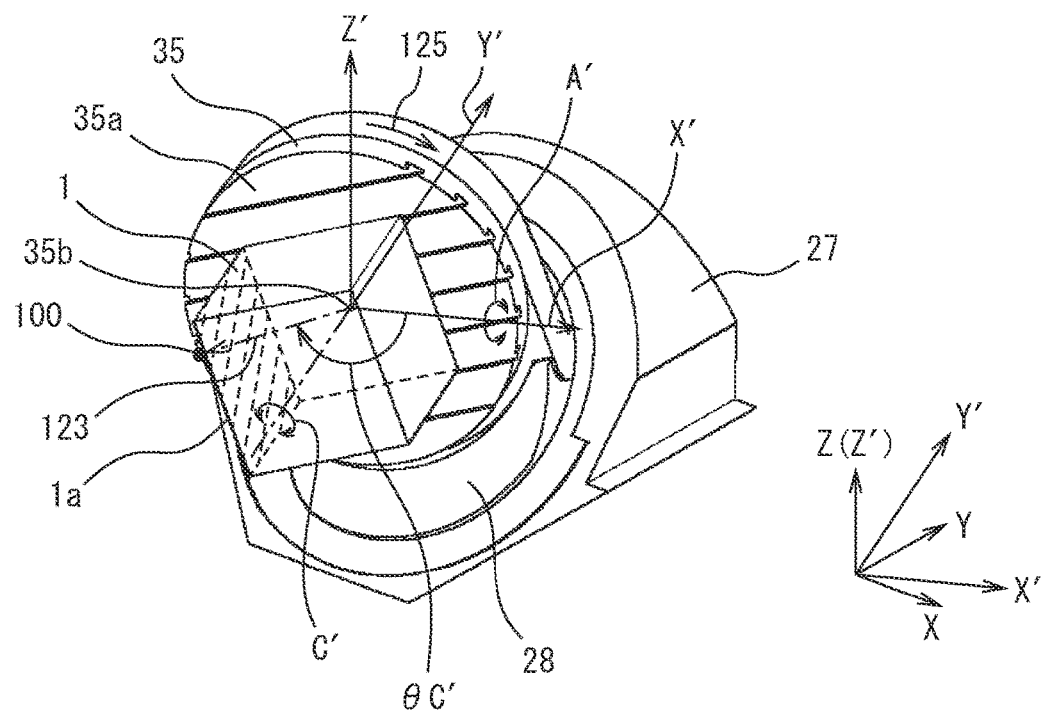
FIG. 28 is a schematic perspective view of the table and the workpiece in a second step of the first control of Embodiment 2.
Figure 29:
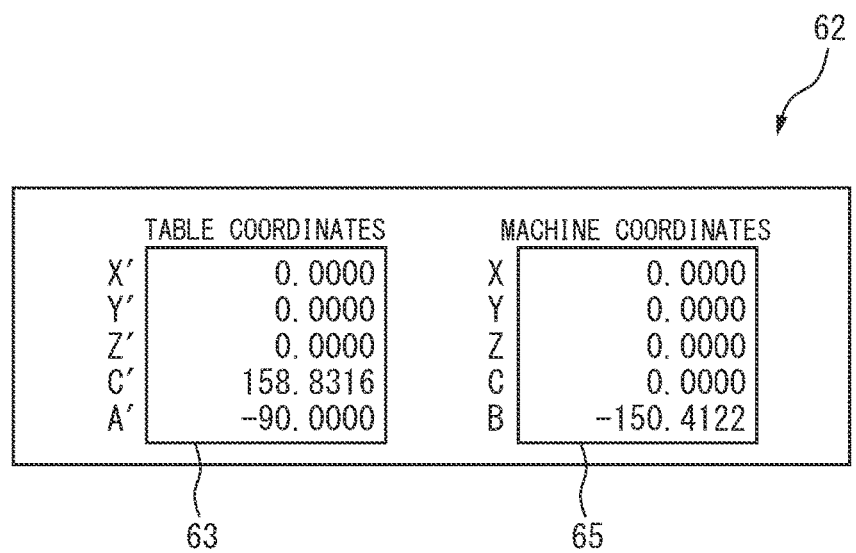
FIG. 29 is the coordinate display unit in the second step of the first control of Embodiment 2.

FIG. 28 shows a schematic perspective view of the workpiece and the table in the intermediate state in the first control of the present embodiment. FIG. 29 shows the coordinate display unit in the intermediate state of the first control of the present embodiment. In the intermediate state, rotary movement in the B-axis direction is terminated, and the workpiece attachment surface 35a is perpendicular with respect to the XY-plane of the machine coordinate system.

In a similar manner to Embodiment 1, the Z'-axis of the table coordinate system remains parallel to the Z-axis of the machine coordinate system even upon rotary movement of the table 35. The X'-axis and the Y'-axis of the table coordinate system move within a plane perpendicular to the Z'-axis. The X'-axis of the table coordinate system of the present embodiment is set on the workpiece attachment surface 35a. The X'-axis moves while remaining parallel to the workpiece attachment surface 35a when the inclination swivel base 28 has rotated. The X'-axis moves in contact with the workpiece attachment surface 35a. The A'-axis is a rotary feed axis of which the axis line is the X'-axis and therefore moves together with the rotary movement in the B-axis direction. The Y'-axis of the table coordinate system moves, remaining orthogonal to the X'-axis within a plane perpendicular to the Z'-axis. In a control example shown in FIG. 28, the Y'-axis of the table coordinate system moves toward the back side of the table 35.

In this manner, as a virtual linear motion axis which is set on the surface of the workpiece attachment surface 35a and moves within a plane perpendicular to the third virtual linear motion axis together with the movement of the workpiece attachment surface 35a, one of the first virtual linear motion axis and the second virtual linear motion axis can be set.

Figure 30:
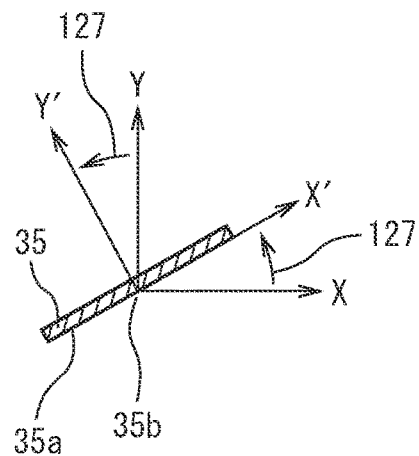
FIG. 30 is a schematic plan view showing movement of the X'-axis and the Y'-axis in the first control of Embodiment 2.

FIG. 30 shows a schematic plan view illustrating the situation of movement of the X'-axis and the Y'-axis of the table coordinate system when the inclination swivel base has rotated. In the present embodiment, the X'-axis moves together with the workpiece attachment surface 35a, as depicted by an arrow 127, when the inclination swivel base 28 has rotated in the B-axis direction. The Y'-axis rotates while maintaining an angle of 90° against the X'-axis.

Referring to FIG. 26 and FIG. 28, an axis line of the C'-axis is the Z'-axis, in the reference state. The axis line of the C'-axis moves together with the rotary movement of the table 35 in the B-axis direction. In the intermediate state, the axis line of the C'-axis is the Y'-axis.

The rotation angle of the A'-axis corresponds to the angle of the workpiece attachment surface 35a with respect to a plane perpendicular to the Z'-axis of the table coordinate system. In other words, the coordinate value of the A'-axis is similar to the coordinate value of the B'-axis in Embodiment 1.

Referring to FIG. 26, the reference point 100 and a reference line depicted by the arrow 123 are set on the X'-axis in the reference state. The reference line is fixed to the workpiece attachment surface 35a and moves together with the workpiece attachment surface 35a. Referring to FIG. 28, the rotation angle θC' in the C'-axis direction corresponds to the angle between the X'-axis and the arrow 123. In other words, the coordinate value of the C'-axis corresponds to the angle corresponding to the rotation angle θC'.

Referring to FIG. 29, the coordinate value of the A'-axis decreases to the negative side through rotation of the inclination swivel base 28 in the negative direction of the B-axis of the machine coordinate system. When the coordinate value of the A'-axis is −90°, the workpiece attachment surface 35a is perpendicular with respect to the XY-plane of the machine coordinate system. Because the inclination swivel base 28 rotates, the coordinate value of the C'-axis of the table coordinate system is a predetermined value. On the other hand, the coordinate value of the B-axis of the machine coordinate system is the same as the coordinate value of the B-axis in the intermediate state of control corresponding to the machine tool of type B in Embodiment 1 (see FIG. 14). In control corresponding to the machine tool of type A, an operator can check the inclination of the workpiece attachment surface 35a by checking the coordinate value of A'-axis of the table coordinate system.

Referring to FIG. 28, the table 35 is next rotated in the positive direction of the C-axis manually, as depicted by the arrow 125, to shift to the final state. Control of turning the machining target surface 1a to face the positive side of the Z-axis of the machine coordinate system is performed.

Figure 31:
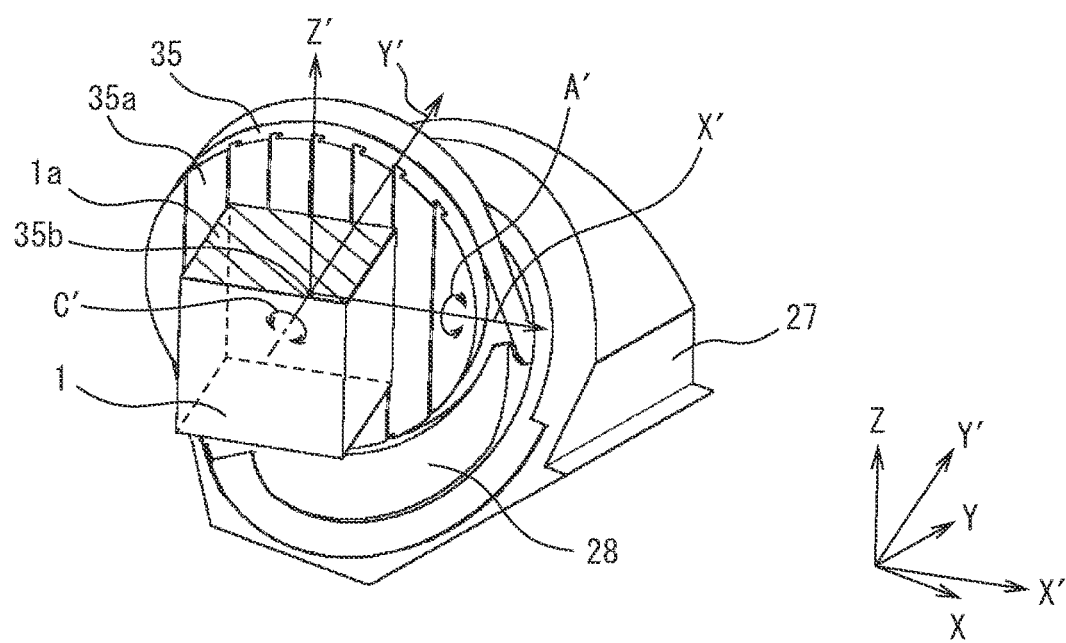
FIG. 31 is a schematic perspective view of the table and the workpiece in a third step of the first control of Embodiment 2.
Figure 32:
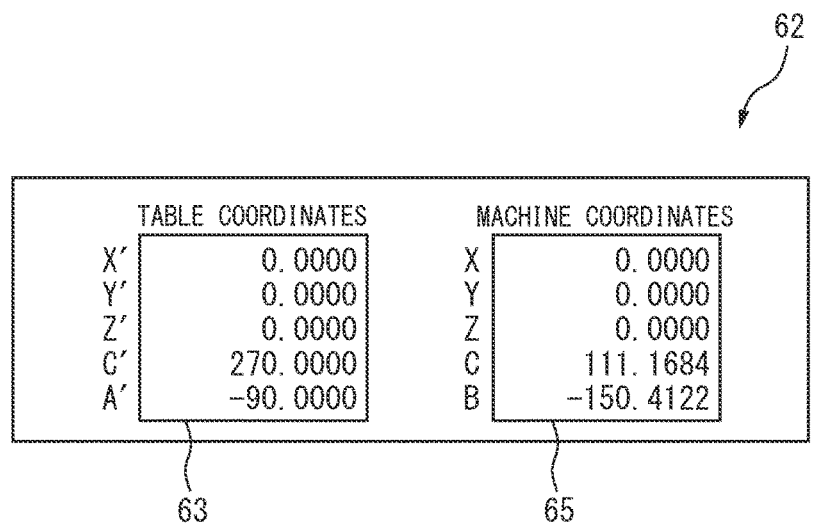
FIG. 32 is the coordinate display unit in the third step of the first control of Embodiment 2.

FIG. 31 shows a schematic perspective view of the workpiece and the table in the final state in the first control of the present embodiment. FIG. 32 shows the coordinate display unit in the final state of the first control of the present embodiment. By rotating the table 35 in the C-axis direction, the machining target surface 1a of the workpiece 1 can be turned to face the tool 41. The state of the workpiece attachment surface 35a and the orientation of the workpiece 1 in the final state of the present embodiment are similar to the final state of the first control of Embodiment 1. When the coordinate value of the C'-axis of table coordinate system is 270°, the machining target surface 1a faces the positive side of the Z-axis of the machine coordinate system. The coordinate value of the A'-axis and the coordinate value of C'-axis of the table coordinate system correspond to the coordinate value of the A-axis and the coordinate value of the C-axis when rotary movement has taken place in the A-axis direction and the C-axis direction in the machine tool of type A of the reference example.

In this manner, by checking the coordinate value of the A'-axis and the coordinate value of the C'-axis of the table coordinate system, the orientation of the workpiece can be checked and adjusted. A portion of the workpiece to be machined can be turned to face a desired direction. The orientation of the workpiece can be adjusted with a feel of operation similar to the machine tool of type A of the reference example. An operator who has been using the machine tool of type A of the reference example can perform rotary movement with a feel of operation similar to a conventional one.

Next, referring to FIG. 33 to FIG. 37, a second control of the present embodiment will be described. The second control includes accompanying rotation control. In the second control, the control device rotates the table 35 in the C-axis direction, when the inclination swivel base 28 is being rotated in the B-axis direction manually. At this time, the control device carries out control to maintain a state in which the machining target surface 1a of the workpiece 1 faces the positive side of the X'-axis.

Figure 33:
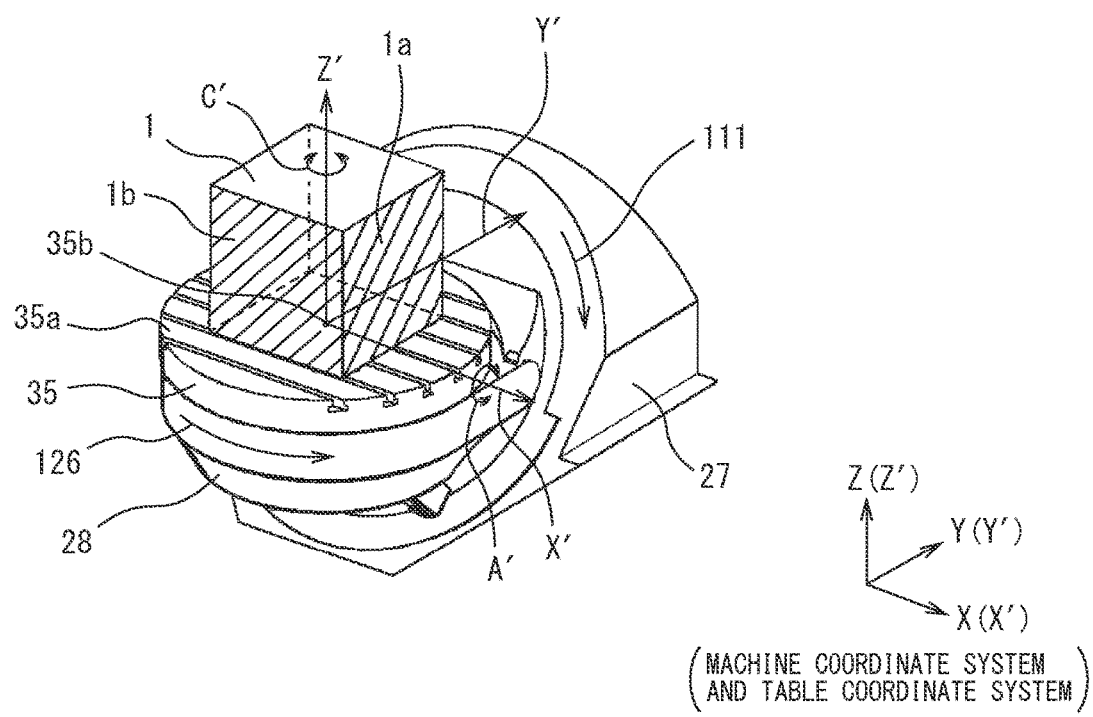
FIG. 33 is a schematic perspective view of the table and the workpiece in a first step of a second control of Embodiment 2.
Figures 34, 35:
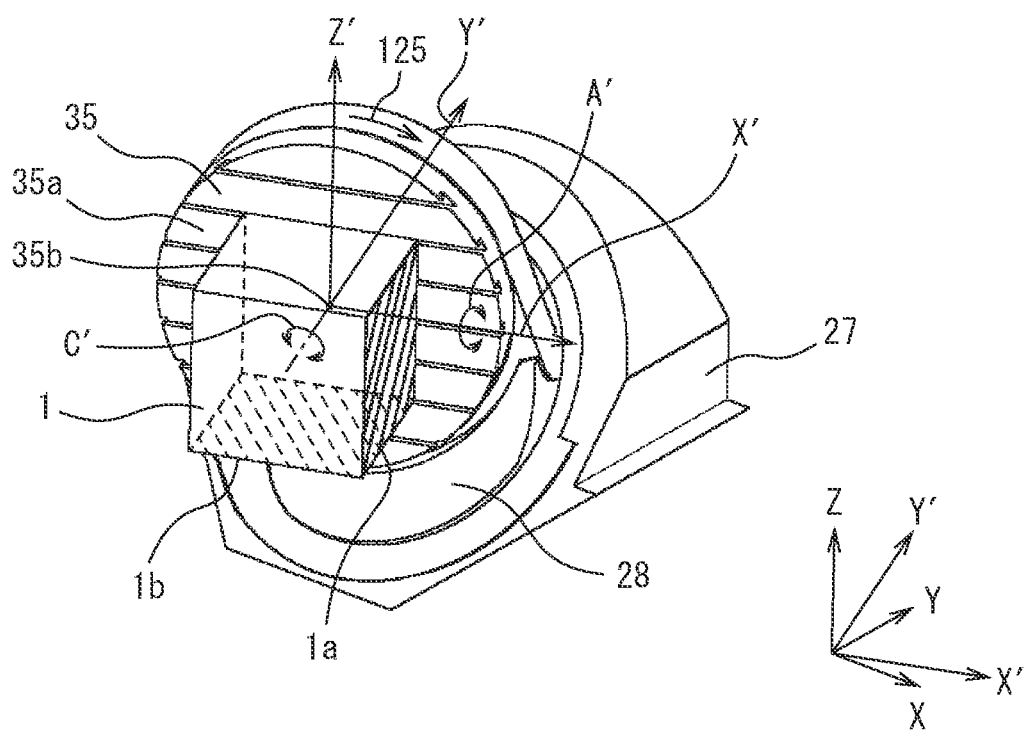
FIG. 34 is the coordinate display unit in the first step of the second control of Embodiment 2.
FIG. 35 is a schematic perspective view of the table and the workpiece in a second step of the second control of Embodiment 2.

FIG. 33 is a schematic perspective view of the table and the workpiece, depicting the reference state of the second control of the present embodiment. In FIG. 34, there is the coordinate display unit in the reference state of the second control of the present embodiment. In the workpiece 1, the machining target surface 1a and the reference surface 1b are set. The inclination swivel base 28 is rotated in the negative direction of the B-axis, as depicted by the arrow 111. At this time, in the second control of the present embodiment, the table 35 is rotated in the negative direction of the C-axis, as depicted by the arrow 126.

Figure 36:
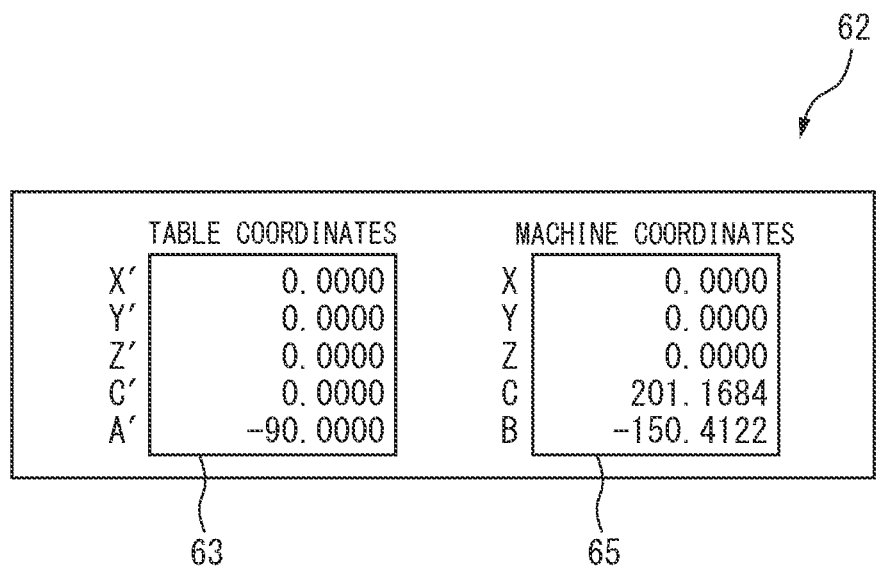
FIG. 36 is the coordinate display unit in the second step of the second control of Embodiment 2.

FIG. 35 is a schematic perspective view of the table and the workpiece in the intermediate state of the second control of the present embodiment. FIG. 36 is the coordinate display unit in the intermediate state of the second control of the present embodiment. When the coordinate value of the A'-axis has become −90° upon rotation of the inclination swivel base 28, the workpiece attachment surface 35*a* is perpendicular with respect to the XY-plane of the machine coordinate system. In other words, the state is close to a state of the machine tool of type A of the reference example when rotation has taken place in the A-axis direction by −90°. At this time, the control device rotates the table 35 in the C-axis direction for control to maintain the coordinate value of the C'-axis at zero. The rotation in the C-axis direction is controlled so that the machining target surface 1*a* faces the positive side of the X'-axis of the table coordinate system. The machining target surface 1*a* is controlled to remain perpendicular to the X'-axis. In other words, the machining target surface 1*a* is controlled to remain perpendicular to the XY-plane of the machine coordinate system.

In the second control of the present embodiment, the motion can be made close to a motion upon rotating the table in the A-axis direction in the machine tool of type A of the reference example. For example, the orientation of the machining target surface 1*a* in the intermediate state is close to a state upon rotation by −90° in the A-axis direction in the machine tool of type A of the reference example. Therefore, an operator can adjust the orientation of the machining target surface 1*a* with a feel of operation similar to the machine tool of type A of the reference example.

By then rotating the table 35 in the C-axis direction, as depicted by the arrow 125, the machining target surface 1*a* can be turned to face the positive side of the Z-axis of the machine coordinate system. In other words, the final state depicted in FIG. 31 and FIG. 32 can be reached.

In the control device of the present embodiment as well, the coordinate value of the A'-axis and the coordinate value of the C'-axis of the table coordinate system can be computed on the basis of the coordinate value of the B-axis of the machine coordinate system, with a computing method similar to Embodiment 1. A rotation angle θA' of the A'-axis of the table coordinate system can be denoted by the following expression (13), in a similar manner to expression (5) described above.

[Formula 7]

$$\theta A' = \cos^{-1}(Z_{tz}) \quad (13)$$

The rotation angle θC' of the C'-axis can be represented by the following expression (14), instead of expression (12) described above.

[Formula 8]

$$\theta C' = \cos^{-1}\left(\frac{X_{tx} \times X_{bx} + X_{ty} \times X_{by}}{\sqrt{\overline{X}_t^2 + \overline{X}_b^2}}\right) \quad (14)$$

where $$\overline{X}_t^2 = X_{tx}^2 + X_{ty}^2 + X_{tz}^2$$

$$\overline{X}_b^2 = X_{bx}^2 + X_{by}^2 + X_{bz}^2$$

In the first control and the second control of the present embodiment, the relative position of the tool with respect to the workpiece can be adjusted manually using the MDI device 81 of the input unit 78. As an M code of the MDI device, a control code similar to expression (1) described above can be used. In a case corresponding to the machine tool of type A of the reference example, the first virtual rotary feed axis corresponds to the A'-axis. The M code can be generated, with the second virtual rotary feed axis taken as corresponding to the C'-axis.

Referring to FIG. 10, when control corresponding to the machine tool of type A of the present embodiment has been selected, the coordinate value of the B'-axis in the table coordinate display unit 63 is displayed in place of the coordinate value of the A'-axis. The schematic-view display unit 64 of the display unit 84 displays a schematic view of the machine tool of type A of the reference example. The schematic-view display unit 64 displays a schematic view of the machine tool including the A-axis about an axis line parallel to the X-axis. The rotary feed axes for the table are displayed as the C-axis and the A-axis.

The machine tool can be formed so that one of control corresponding to the machine tool of type B in Embodiment 1 and control corresponding to the machine tool of type A of the present embodiment can be performed. Further, the machine tool can be formed to be capable of performing both controls of the control corresponding to the machine tool of type B and the control corresponding to the machine tool of type A. Regarding a control to be performed, the tool can be configured to be selectable by an operator.

Referring to FIG. 3, the control device 70 includes a table form selection unit 82. The table form selection unit 82 is formed so that an operator can select the machine tool of type A of the reference example or the machine tool of type B of the reference example. The type of the machine tool selected with the table form selection unit 82 is transmitted to the arithmetic unit 83.

The control device 70 is formed so that an operator can select the first control or the second control. The control device 70 includes an accompanying rotation control selection unit 85. The accompanying rotation control selection unit 85 is formed so that whether or not to perform accompanying rotation control can be selected by an operator. The control selected with the accompanying rotation control selection unit 85 is transmitted to the arithmetic unit 83. The arithmetic unit 83 generates a movement instruction or calculates a coordinate value on the basis of such selections.

Figure 37:
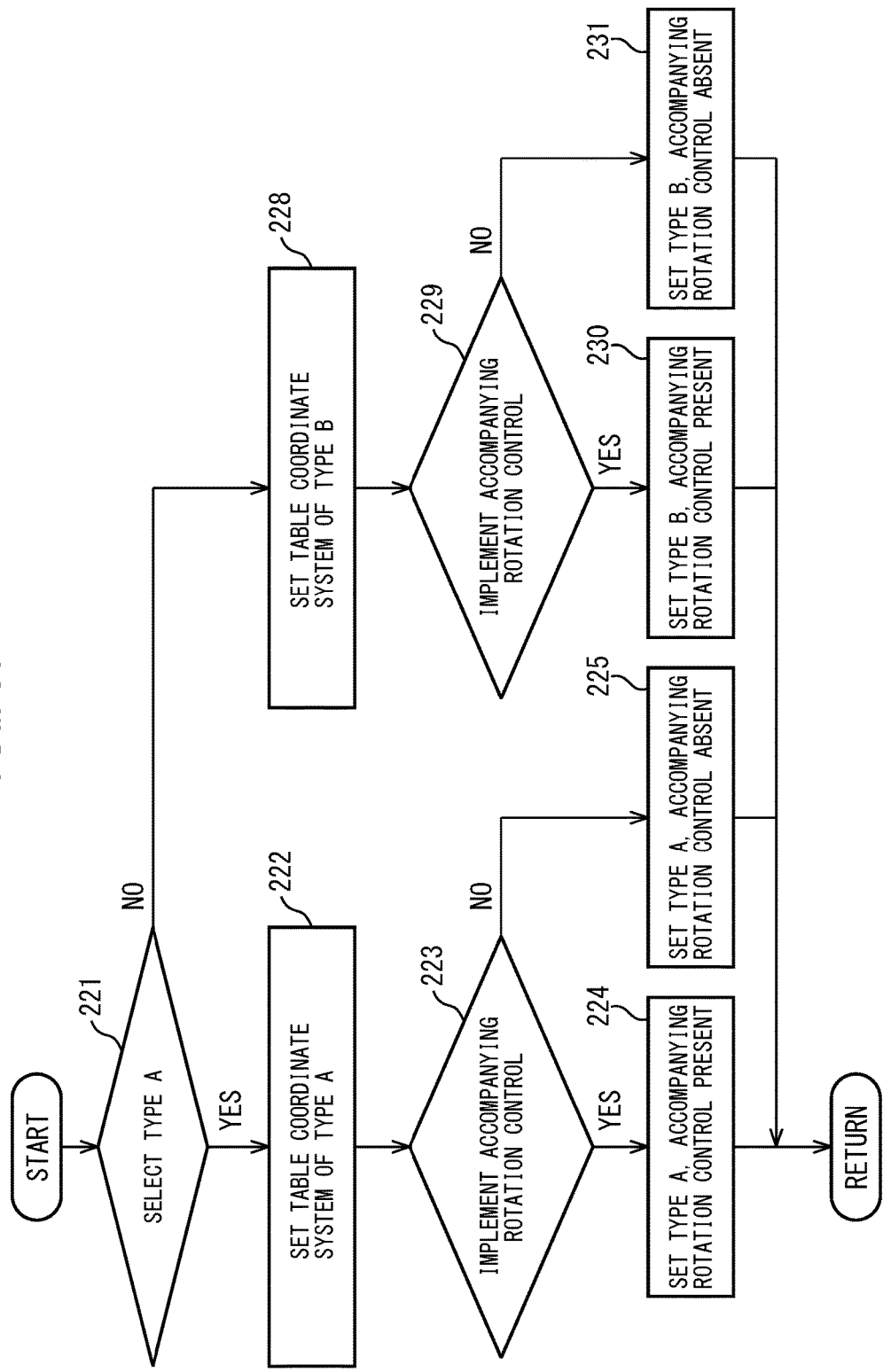
FIG. 37 is a flowchart for selecting the type of machine tool of the reference example and control upon rotary movement of the table in the B-axis direction, for a machine tool of Embodiment 2.

FIG. 37 shows a flowchart of selecting the type of the table coordinate system and implementation of accompanying rotation control upon rotary movement in the B-axis direction. The control shown in FIG. 37 can be performed upon starting the machine tool, for example. Alternatively, implementation can be in a time period desired by an operator.

In step 221, whether or not an operator selects the machine tool of type A of the reference example is determined. When an operator has selected the machine tool of type A of the reference example in step 221, it shifts to step 222. In step 222, the table coordinate system is set to the coordinate system corresponding to the machine tool of type A of the reference example.

Next, in step 223, whether or not to perform accompanying rotation control is determined. When implementation of accompanying rotation control has been selected, it shifts to step 224. In step 224, the display unit is set so that display corresponds to the machine tool of type A of the reference example. Accompanying rotation control is set to be performed upon manual rotation of the table in the B-axis direction.

When implementation of accompanying rotation control is not selected in step 223, it shifts to step 225. In step 225, the display unit is set so that display corresponds to the machine tool of type A of the reference example. Accompanying rotation control is set to be not performed upon manual rotation of the table in the B-axis direction.

On the other hand, when the machine tool of type A of the reference example is not selected in step 221, it shifts to step 228. In step 228, the table coordinate system is set to the coordinate system corresponding to the machine tool of type B of the reference example.

Next, in step 229, whether or not to select implementation of accompanying rotation control is determined. When implementation of accompanying rotation control has been selected in step 229, it shifts to step 230. In step 230, the display unit is set so that display corresponds to the machine tool of type B of the reference example. Accompanying rotation control is set to be performed upon rotation of the table in the B-axis direction.

When an operator does not select implementation of accompanying rotation control in step 229, it shifts to step 231. In step 231, the display unit is set so that display corresponds to the machine tool of type B of the reference example. Accompanying rotation control is set to be not performed upon rotation of the table in the B-axis direction.

In this manner, with the machine tool, one of the machine tool of type A and the machine tool of type B of the reference example can be selected for the table coordinate system to be displayed in the display unit, according to the wish of an operator. In addition, whether or not to perform accompanying rotation control can be selected.

Other configurations, operations, and effects are similar to Embodiment 1, and therefore descriptions will not be repeated.

The control device of the present invention can calculate and display the coordinate value of the first virtual rotary feed axis about the first virtual axis line parallel to the virtual linear motion axis of one of the three virtual linear motion axes orthogonal to each other, from the coordinate value of the first rotary feed axis about the first axis line inclined with respect to all of the three linear motion axes orthogonal to each other. In other words, the rotation angle of the inclined rotary feed axis in reality is converted to and displayed as the rotation angle of the rotary feed axis which is virtual and not inclined. Therefore, when changing the relative position of the workpiece with respect to the tool manually, the orientation of the workpiece with respect to the tool can be set easily. Also when the machine configuration is such that the second rotary feed axis is placed on the inclined first rotary feed axis, the rotation angle value of the two rotary feed axes can be converted and displayed, simulating a normal machine configuration such as of a trunnion-type in which the second virtual rotary feed axis is placed on the first virtual rotary feed axis with the two being orthogonal. In addition, the state of rotation of the table can be displayed in an easily comprehensible manner as a schematic view.

With such a configuration of the control device, a machine operator who has been familiar to using a table device of a machine tool of one of the machine tool of type A in which the C-axis is placed on the A-axis with the two being orthogonal or the machine tool of type B in which the C-axis is placed on the B-axis with the two being orthogonal, for example, can also easily handle a table device of the machine tool of the present invention in which the C-axis is placed on the inclined B-axis. At this time, the type of the table device to be simulated out of the machine tool of type A and the machine tool of type B can be selected in accordance with the preference of an operator. In a similar manner to a normal table device such as of a trunnion-type, the table can be moved so that an intended surface opposes the tool mounted to the spindle, in a state in which a predetermined surface of the workpiece attached to the workpiece attachment surface of the table constantly faces a predetermined direction. In this manner, a manual feeding operation through input with the manual pulse generator, a jog-feeding button, or a manual program can be executed easily by looking at the coordinate value or schematic view displayed in the display unit.

In Embodiment 1 and Embodiment 2 described above, the machine tool including two rotary feed axes has been illustrated as an example. However, the form is not limited to this, and the present invention can be applied to a machine tool including a rotary feed axis about an axis line inclined with respect to three linear motion axes. For example, the present invention can be applied also to a machine tool with one rotary feed axis of which an axis line is inclined.

In the machine tool of Embodiment 1 and Embodiment 2 described above, the axis line of the B-axis is arranged to be parallel to the YZ-plane while being inclined with respect to the XY-plane of the machine coordinate system. However, the form is not limited to this, and the axis line of the rotary feed axis may be inclined with respect to all planes of the XY-plane, the YZ-plane, and the ZX-plane.

In Embodiment 1 and Embodiment 2 described above, the vertical machine tool has been taken as an example and illustrated. However, the form is not limited to this, and the present invention can be applied also to a horizontal machine tool. In other words, the present invention can be applied also to a machine tool with the Z-axis extending in the horizontal direction in the reference state in which the coordinate values of all linear motion axes are zero and further the angles of rotation of all rotary feed axes are 0°.

The table coordinate system is not limited to Embodiment 1 and Embodiment 2. A coordinate system can be employed in which a first virtual linear motion axis, a second virtual linear motion axis, and a third virtual linear motion axis orthogonal to each other with the reference being a workpiece attachment surface of a table are set, a first virtual axis line parallel to any virtual linear motion axis of the first virtual linear motion axis, the second virtual linear motion axis, and the third virtual linear motion axis is further set, and a first virtual rotary feed axis about the first virtual axis line is set.

Each form of Embodiment 1 and Embodiment 2 described above can be appropriately combined. In the control by the control device, the order of steps can be changed appropriately without changing the function and operation. In each figure described above, the same or corresponding portions are denoted by the same reference sign. The embodiments described above are exemplary and do not limit the invention. The embodiments include changes in form set forth in the scope of claims.

REFERENCE SIGNS LIST

1 workpiece
1*a* machining target surface
28 inclination swivel base
35 table
35*a* workpiece attachment surface
41 tool
52, 53 axis line
62 coordinate display unit
63 table coordinate display unit
64 schematic-view display unit
70 control device
78 input unit
79 manual pulse generator
80 jog-feeding device
81 MDI device 82 table form selection unit
83 arithmetic unit
84 display unit
85 accompanying rotation control selection unit

The invention claimed is:

1. A machine tool comprising:
a first linear motion axis, a second linear motion axis, and a third linear motion axis of a machine coordinate system which are orthogonal to each other;
a first rotary feed axis about a first axis line inclined with respect to all linear motion axes of the first linear motion axis, the second linear motion axis, and the third linear motion axis, the first rotary feed axis and the linear motion axes being configured to move a table on which a workpiece is placed;
servomotors connected to the first, second and third linear motion axes and the first rotary feed axis;
a servomotor control unit which drives and controls the servomotors by an instruction based on the machine coordinate system;
a control device controlling the machine tool based on an instruction of manual operation by an operator in addition to a machining program,
wherein the control device comprises
an arithmetic unit which calculates, from a coordinate value of the machine coordinate system, a coordinate value of a table coordinate system including a first virtual linear motion axis, a second virtual linear motion axis, and a third virtual linear motion axis orthogonal to each other with a reference being a workpiece attachment surface of the table and a first virtual rotary feed axis about a first virtual axis line parallel to one of virtual linear motion axis of the first virtual linear motion axis, the second virtual linear motion axis, and the third virtual linear motion axis; and
a display unit which displays the coordinate value of the table coordinate system calculated by the arithmetic unit, the coordinate value of the table coordinate system being a virtual coordinate value which simulates the coordinate value of the machine coordinate system of the machine tool in which the first axis line of the first rotary feed axis is parallel to one of the linear motion axes.

2. The machine tool according to claim 1, wherein
the third virtual linear motion axis of the table coordinate system is parallel to the third linear motion axis extending in a direction of an axis line of a spindle of the machine tool and is maintained constant in orientation when the workpiece attachment surface has moved,
one virtual linear motion axis of the first virtual linear motion axis and the second virtual linear motion axis is set on a surface of the workpiece attachment surface and moves within a plane perpendicular to the third virtual linear motion axis together with movement of the workpiece attachment surface,
the first virtual axis line is set parallel to the one virtual linear motion axis,
the arithmetic unit computes a coordinate value of the first virtual rotary feed axis of the table coordinate system corresponding to a coordinate value of the first rotary feed axis of the machine coordinate system, and
the display unit displays a coordinate value of the first virtual rotary feed axis of the table coordinate system.

3. The machine tool according to claim 2, wherein a coordinate value of the first virtual rotary feed axis corresponds to an angle of the workpiece attachment surface with respect to a plane perpendicular to the third virtual linear motion axis.

4. The machine tool according to claim 2, wherein
the machine coordinate system includes a second rotary feed axis about a second axis line,
the second axis line extends in a direction perpendicular to the workpiece attachment surface of the table,
the table coordinate system includes a second virtual rotary feed axis about a second virtual axis line,
the second virtual axis line extends in a direction perpendicular to the workpiece attachment surface of the table,
a coordinate value of the second virtual rotary feed axis is an angle which changes in correspondence with a rotation angle about the first axis line upon rotation of the table about the first axis line,
the arithmetic unit computes a coordinate value of the second virtual rotary feed axis of the table coordinate system corresponding to a coordinate value of the first rotary feed axis of the machine coordinate system, and
the display unit displays a coordinate value of the second virtual rotary feed axis of the table coordinate system.

5. The machine tool according to claim 4, wherein
when a reference line extending in a direction identical to the one virtual linear motion axis is fixed to the workpiece attachment surface upon a coordinate value of the second virtual rotary feed axis being 0°, and the reference line is moved together with the workpiece attachment surface, a coordinate value of the second virtual rotary feed axis corresponds to an angle between the one virtual linear motion axis and the reference line, upon the table having rotated about the first axis line.

6. The machine tool according to claim 4, wherein
when rotary movement of the table takes place about the first axis line, the arithmetic unit sets a rotation angle about the second axis line in correspondence with a rotation angle about the first axis line so that a portion specified in advance of a workpiece attached to the workpiece attachment surface is maintained in an orientation specified in advance, and
the control device performs a control of causing rotary movement of the table about the second axis line along with rotary movement of the table about the first axis line.

7. The machine tool according to claim 1, comprising an input unit which allows input of movement information for implementing rotary movement about the first axis line manually, wherein
rotary movement of the table about the first axis line is implemented on a basis of movement information input to the input unit.

8. The machine tool according to claim 7, wherein
the input unit allows input of a control code relating to rotary movement about the first axis line, and rotary movement about the first axis line is implemented on a basis of the control code.

9. The machine tool according to claim 2, wherein the display unit is formed to allow selecting display of a table coordinate for which the first virtual linear motion axis is set on a surface of the workpiece attachment surface or display of a table coordinate for which the second virtual linear motion axis is set on a surface of the workpiece attachment surface.

10. The machine tool according to claim 2, wherein
the display unit displays a schematic view of a machine tool including a rotary feed axis about an axis line which is parallel to one linear motion axis of the first linear motion axis and the second linear motion axis, and in the schematic view, a rotation angle of the first virtual rotary feed axis is set to a rotation angle about the axis line which is parallel.

* * * * *